(12) United States Patent
Yoshida et al.

(10) Patent No.: US 7,708,480 B2
(45) Date of Patent: May 4, 2010

(54) FOCAL PLANE SHUTTER FOR DIGITAL CAMERAS

(75) Inventors: Katsunobu Yoshida, Tokyo (JP); Nobuyoshi Inoue, Saitama (JP)

(73) Assignee: Nidec Copal Corporation, Tokyo (JP)

( * ) Notice: Subject to any disclaimer, the term of this patent is extended or adjusted under 35 U.S.C. 154(b) by 231 days.

(21) Appl. No.: 11/790,612

(22) Filed: Apr. 26, 2007

(65) Prior Publication Data
US 2007/0253707 A1 Nov. 1, 2007

(30) Foreign Application Priority Data
Apr. 27, 2006 (JP) ............................. 2006-123935
Dec. 27, 2006 (JP) ............................. 2006-352666

(51) Int. Cl.
G03B 9/08 (2006.01)
G03B 9/40 (2006.01)

(52) U.S. Cl. .................. 396/510; 396/456; 396/484
(58) Field of Classification Search ............... 348/367; 396/483–484, 497, 510, 456
See application file for complete search history.

(56) References Cited

U.S. PATENT DOCUMENTS

| | | | | |
|---|---|---|---|---|
| 5,172,152 A | * | 12/1992 | Suzuki et al. | 396/489 |
| 6,795,122 B2 | * | 9/2004 | Takahashi | 348/362 |
| 2001/0010560 A1 | * | 8/2001 | Takahashi | 348/367 |
| 2002/0172519 A1 | * | 11/2002 | Takahashi et al. | 396/486 |
| 2004/0042787 A1 | * | 3/2004 | Miyazaki | 396/484 |
| 2006/0087573 A1 | * | 4/2006 | Harada | 348/294 |

FOREIGN PATENT DOCUMENTS

| JP | 2001-222059 | 8/2001 |
|---|---|---|
| JP | 2003-222928 | 8/2003 |

* cited by examiner

*Primary Examiner*—Melissa J Koval
*Assistant Examiner*—Dennis Hancock
(74) *Attorney, Agent, or Firm*—Wenderoth, Lind & Ponack, LLP.

(57) ABSTRACT

A focal plane shutter for digital cameras includes a first driving member for a first blade and a second driving member for the first blade, mounted to the same shaft; arms for the first blade on which a set spring is hooked; and a set member for restraining the first driving member for the first blade in the proximity of the position where the exposure operation is completed, at a set position by rotating a restraining member, and actuating the first driving member for the first blade to the starting position of the exposure operation in the restoration to the initial position immediately after the release.

15 Claims, 14 Drawing Sheets

FOCAL PLANE SHUTTER FOR DIGITAL CAMERAS

BACKGROUND OF THE INVENTION

1. Field of the Invention

This invention relates to a focal plane shutter for digital cameras.

2. Description of Related Art

In focal plane shutters for digital cameras, like focal plane shutters for silver-halide film cameras, there are types in which two shutters, a first blade and a second blade, are provided. The first blade and the second blade are actuated successively in the same direction in photography so that the imaging surface of an image sensor, such as a CCD, is continuously exposed from one end to the other. These first and second blades are connected to a driving member for the first blade and a driving member for the second blade, and after the release of a camera, power to an electromagnet for the first blade and an electromagnet for the second blade is disconnected in turn so that the above driving members are rotated successively by biasing forces of their driving springs and thereby an exposure operation is performed.

The first blade and the second blade are such that after the exposure operation is completed, a set member is actuated from its initial position to rotate the driving members against the biasing forces of the driving springs and thereby the first blade and the second blade are actuated toward their set positions. The set member remains at the set position without returning to the initial position until the release button of the camera is pushed in the next photography. After the release button of the camera is pushed in the next photography and the driving members are securely retained by attractive forces of the electromagnets, the set member is restored to the initial position. In a digital camera equipped with a focal plane shutter of this type, therefore, the imaging surface of the image sensor is covered by the first blade in a set condition, and thus an optical finder, as in the case of the silver-halide film camera, becomes necessary for a finder observing an image of an object to be photographed.

However, when the shutter is constructed so that, in the set operation by the set member mentioned above, the second blade is actuated toward the set position, while the first blade is restrained at the position where the exposure operation is completed, it becomes possible to cause light from the object to strike the imaging surface of the image sensor in the set condition. Hence, the image of the object formed on the imaging surface can be displayed and observed on a monitor such as a liquid crystal display device. However, in the case where the shutter is constructed as mentioned above, it is necessary that when the release button is pushed in photography, the restraint of the first blade is first released so that the first blade is actuated toward the starting position of the exposure operation and after the imaging surface of the image sensor is once brought into a covered state, the first blade and the second blade start the exposure operation as described above.

An example of a focal plane shutter for digital cameras constructed as mentioned above is disclosed in Japanese Patent Kokai No. 2001-222059. According to the structure of this shutter, a conventional driving member for the first blade is designed to include a first driving member for the first blade connecting the first blade and a second driving member for the first blade rotated by the driving spring in the exposure operation. In the set operation, the set member keeps the restraint of the first driving member for the first blade in the proximity of the position where the exposure operation is completed and moves only the second driving member for the first blade toward the set position. After that, when the release button is pushed and the set member is restored to the initial position, the set member releases its restraint so that the first driving member for the first blade and the first blade can be actuated toward starting positions of the exposure operation by biasing forces of set springs.

The focal plane shutter set forth in Kokai No. 2001-222059, however, is constructed so that when the set member is restored to the initial position after the release button of the camera is pushed, the restraint of the first driving member for the first blade is released immediately before the set member reaches the initial position, and the first blade is actuated from the proximity of the position where the exposure operation is completed toward the starting position of the exposure operation. Consequently, the first driving member for the first blade and the first blade, after bounding at the starting positions of the exposure operation, are brought into fixed states after the set member is restored to the initial position. Hence, after the set member is restored to the initial position, the exposure operation of the first blade cannot be immediately started and after the release button is pushed, time required until the first blade starts the exposure operation becomes long. This causes the problem that when the object is moving, there is a high possibility of missing a shutter chance.

Thus, a special restraining member is rotatably mounted on the same shaft as the set member so that when the set operation is performed, the restraining member, instead of the set member, restrains the first driving member for the first blade immediately in the proximity of the position where the exposure operation is completed. When the release button is pushed and the set member is restored to the initial position, the restraint is released at the initial stage of this restoration operation, while when the set member has been restored to the initial position, the first driving member for the first blade and the first blade, after bounding at the starting positions of the exposure operation, are brought into the fixed states. A focal plane shutter for digital cameras constructed in this way is disclosed in Japanese Patent Kokai No. 2003-222928.

In the structure of the focal plane shutter set forth in Kokai No. 2003-222928, in addition to the fact that the set member and the restraining member are mounted on the same shaft, as mentioned above, the set member is provided with a hook section that has flexibility and is configured with an engaging part at its top, and the restraining member is configured with two parts to be engaged on the periphery. When the set operation is performed by the set member, the engaging part of the hook section engages one part to be engaged and the restraining member is rotated in such a way that it is pulled. After the restraining member abuts on a stopper at the position where it is capable of restraining the rotation of the first driving member for the first blade, its engagement is released by the flexure of the hook section and only the set member continues to rotate so that, at the set position, the hook section is restored to the original by its own resilience and then is stopped. When the operation is carried out so that the set member is restored to the original position, the engaging part of the hook section engages the other part to be engaged of the restraining member to rotate the restraining member in such a way as to push it, and thereby the restraint of the first driving member for the first blade is released. After that, when the restraining member abuts on the stopper, its engagement is released by the flexure of the hook section, and immediately before reaching the set position, the hook section is restored to the original by its own resilience and then is stopped.

The focal plane shutter described in Kokai No. 2003-222928 is constructed so that the set member reciprocates and rotates the restraining member through the engagement of the engaging part of the hook section with two parts to be engaged of the restraining member and this engagement is released by the flexure of the hook section. However, it is extremely difficult to actually mass-produce the focal plane shutter constructed in this way. This is because it is very difficult to fabricate the shutters so that the resilience of the hook section is uniformly provided or so that the friction surface of the engaging part and those of the two parts to be engaged have a preset arrangement relationship.

Consequently, in the case where such focal plane shutters are mass-produced, even though the restraining member can be rotated by the engagement of the engaging part with the parts to be engaged, sometimes the hook section is not favorably flexed and the engagement of the engaging part with the parts to be engaged is not smoothly released when the rotation of the restraining member is stopped. Further, even though the engagement of the engaging part with the parts to be engaged can be smoothly released when the rotation of the restraining member is stopped, the engagement of the engaging part with the parts to be engaged may be released before the restraining member, when rotated, abuts on the stopper at a preset position of rotation. In particular, when the set member is restored to the initial position, the part to be restrained of the first driving member for the first blade is pressed against the restraining part of the restraining member by the biasing force of the set spring, and thus before the restraint of the first driving member for the first blade is released the hook section may be flexed to release the engagement of the engaging part with the parts to be engaged. Moreover, cases sometimes occur in which, while the set member is repeatedly rotated, the hook section, after being flexed, ceases to be restored to a preset original shape, the engagement of the engaging part with the parts to be engaged is not favorably carried out, and the restraining member cannot be securely rotated by the set member.

SUMMARY OF THE INVENTION

An object of the present invention is to provide a focal plane shutter for digital to cameras which is provided with a first blade and a second blade and comprises a first driving member for the first blade in which the driving mechanism of the first blade is connected to the first blade to actuate the first blade toward the starting position of an exposure operation by the biasing force of a set spring and a second driving member for the first blade in which the first blade is actuated through the first driving member for the first blade by the biasing force of a driving spring for the first blade in the exposure operation. When a set member is actuated from the initial position, only the second driving member for the first blade is actuated toward the set position against the biasing force of the driving spring for the first blade, but in the first driving member for the first blade, the actuation toward the starting position of the exposure operation is restrained by a restraining member until the initial stage of the actuation that the release button is pushed and the set member is restored to the initial position. The restraining member is always associated with the rotation of the set member so that it is rotated at an angle different from the set member, and thereby the restraint of the first driving member for the first blade in a set condition is securely applied, a shock where the first driving member for the first blade abuts on the second driving member for the first blade at the starting position of the exposure operation by releasing the restraint is absorbed, and the exposure operation can be rapidly started.

In order to achieve the above object, the focal plane shutter for digital cameras of the present invention comprises a base plate which has an exposure aperture section and on which a first shaft, a second shaft, a third shaft, and a fourth shaft are set upright. A first driving member for a first blade has a part to be restrained and is connected to the first blade and rotatably mounted to the first shaft; a second driving member for the first blade is rotatably mounted to the first shaft and is actuated, together with the first driving member for the first blade, by the biasing force of a driving spring for the first blade in the exposure operation to cause the first blade to perform the exposure operation. A set spring to which, when at least the second driving member for the first blade is located at a set position, biasing forces are applied is for actuating the first driving member for the first blade and the first blade toward starting positions of the exposure operation. A driving member for a second blade is connected to the second blade, is rotatably mounted to the second shaft, and is actuated by the biasing force of a driving spring for the second blade in the exposure operation to cause the second blade to perform the exposure operation. A set member having a projection, rotatably mounted to the third shaft and actuated from the initial position to the set position in a set operation to actuate the second driving member for the first blade and the driving member for the second blade to their set positions against biasing forces of driving springs, and restored to the initial position prior to the exposure operation of the first blade when a camera is released. A restraining member having a restraining part and an engaging part, rotatably mounted to the fourth shaft, is reciprocated and rotated in association with the set member by the engagement of the engaging part with the projection so that when the set member is located at the set position, the restraining part comes in contact with the part to be restrained in order to keep the exposure aperture section in a fully opened state and the rotation of the first driving member for the first blade due to the biasing force of the set spring is restrained and so that when the set member is restored to the initial position, this restraint is released.

In this case, it is favorable that the restraining member is constructed so that the engaging part is configured in a forked shape to hold the projection. The restraining member may be constructed so that it is biased by a spring and rotated in one direction, is rotated against the biasing force of the spring by pressing the engaging part with the projection in the set operation of the set member, and is rotated by the biasing force of the spring in such a way that the engaging part follows up the projection in the restoration operation of the set member.

It is desirable that the first blade includes a plurality of arms, one end of each of which is rotatably mounted to the base plate, and at least one blade pivotally supported by the plurality of arms, and the set spring is designed to have a biasing force weaker than the driving spring for the first blade so that, by hooking one end of the spring to one of the plurality of arms and the other end to the base plate, the first driving member for the first blade and the first blade are constantly actuated toward the starting positions of the exposure operation. The set spring may be constructed so that, by hooking one end to the first driving member for the first blade and the other end to the second driving member for the first blade, only when the part to be restrained is restrained by the restraining part, biasing forces are imparted in directions in which the first driving member for the first blade and the first blade are actuated toward the starting positions of the exposure operation.

The focal plane shutter for digital cameras further comprises an operating part provided in the second driving member for the first blade. An electromagnet for the first blade is energized at the initial stage of the release, allowing the exposure operation of the first blade to be performed by the second driving member for the first blade when power to the electromagnet is disconnected after the operation of restoration to the initial position of the set member. An electromagnet for the second blade is energized at the initial stage of the release, allowing the exposure operation of the second blade to be performed by the driving member for the second blade when power to the electromagnet is disconnected after the start of the exposure operation of the first blade. A switch means is operated by the operating part on completion of the exposure operation of the first blade, and constructed as a signal source for preventing the set member from starting the next set operation when the switch means is not operated at a preset time after the electromagnet for the first blade is energized. In a shutter constructed in this way, even when trouble is produced in the control circuit of the electromagnet, no error is caused to an associated structure including the set member, the restraining member, and the first driving member for the first blade in the next set operation. In this case, when the switch means is also constructed as a signal source for error display, it becomes possible to readily recognize the error.

In the present invention, the focal plane shutter for digital cameras is provided with the first blade and the second blade so that the driving mechanism of the first blade includes the first driving member for the first blade connected to the first blade and the second driving member for the first blade actuating the first blade through the first driving member for the first blade by the biasing force of the driving spring for the first blade in the exposure operation, and so that the first driving member for the first blade is restrained by the restraining member from following up the second driving member for the first blade at the initial stage of the set operation of the set member, and the front of the image sensor is opened and an image of an object can be observed through a liquid crystal display device in the set condition. In this case, the restraining member and the set member are mounted to different shafts so that the restraining member is always rotated in association with the rotation of the set member, but are different in the angle of rotation. Consequently, in the set condition of the set member, the actuation of the first driving member for the first blade caused by the set spring can be securely restrained in the proximity of the position where the exposure operation is completed, and when the set member is restored to the initial position after the release of the camera, the first driving member for the first blade is actuated by following up the restraining member and its restraint is released immediately before the set member reaches the initial position. Thus, unlike the conventional structure in which the restraint is released in the proximity of the position where the exposure operation is completed, it is not necessary to effect stabilization in the release, and after the restraint is released, a shock of an abutment on the second driving member for the first blade at the starting position of the exposure operation is slight and the exposure operation can be rapidly started.

This and other objects as well as the features and advantages of the present invention will become apparent from the following detailed description of the preferred embodiments when taken in conjunction with the accompanying drawings.

DETAILED DESCRIPTION OF THE PREFERRED EMBODIMENTS

Figure 11:
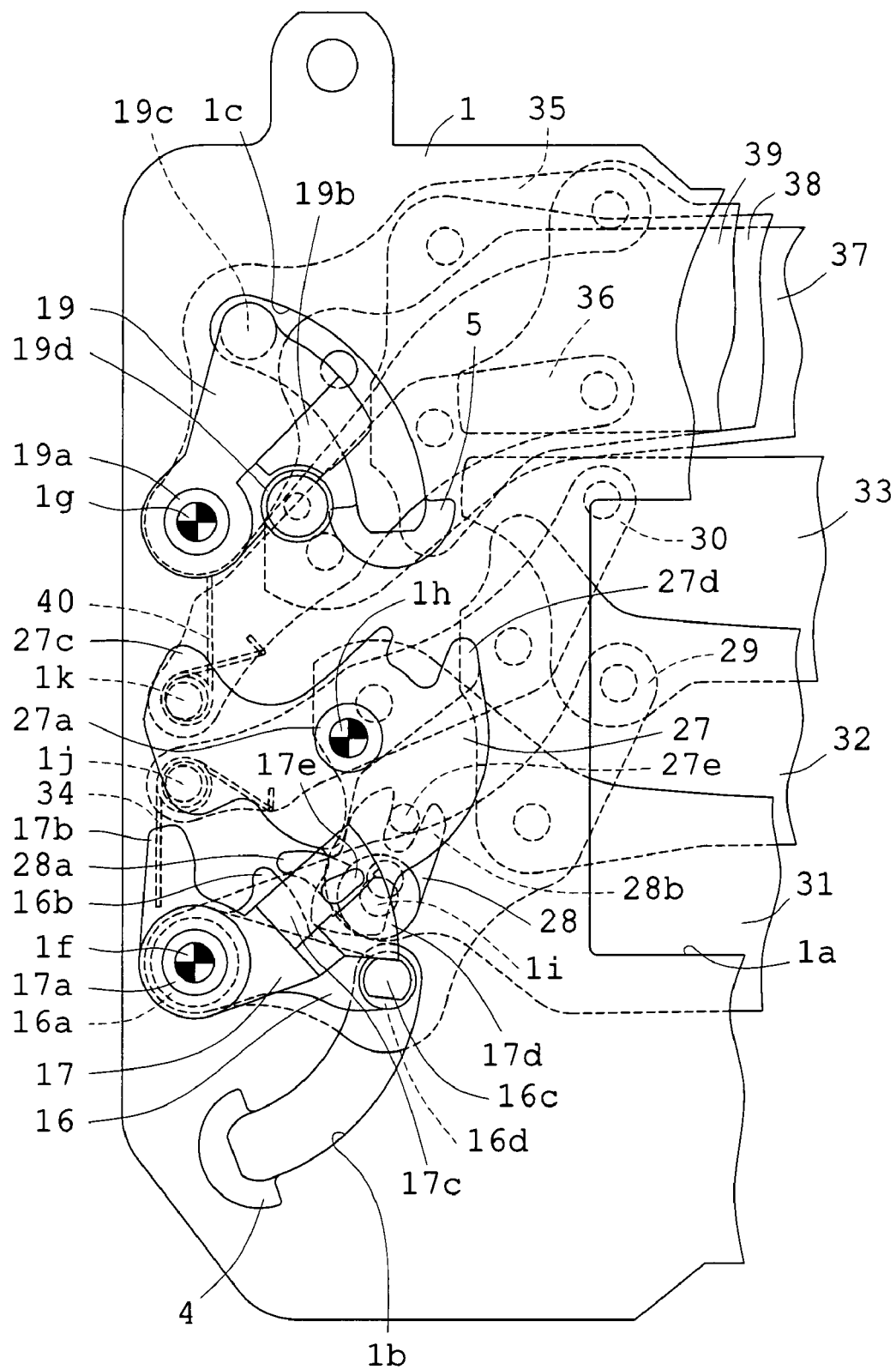
FIG. 11 is a plan view showing Embodiment 1 as in FIG. 5, in a state immediately before the start of the exposure operation that the set member is stopped at the initial position.
Figure 12:
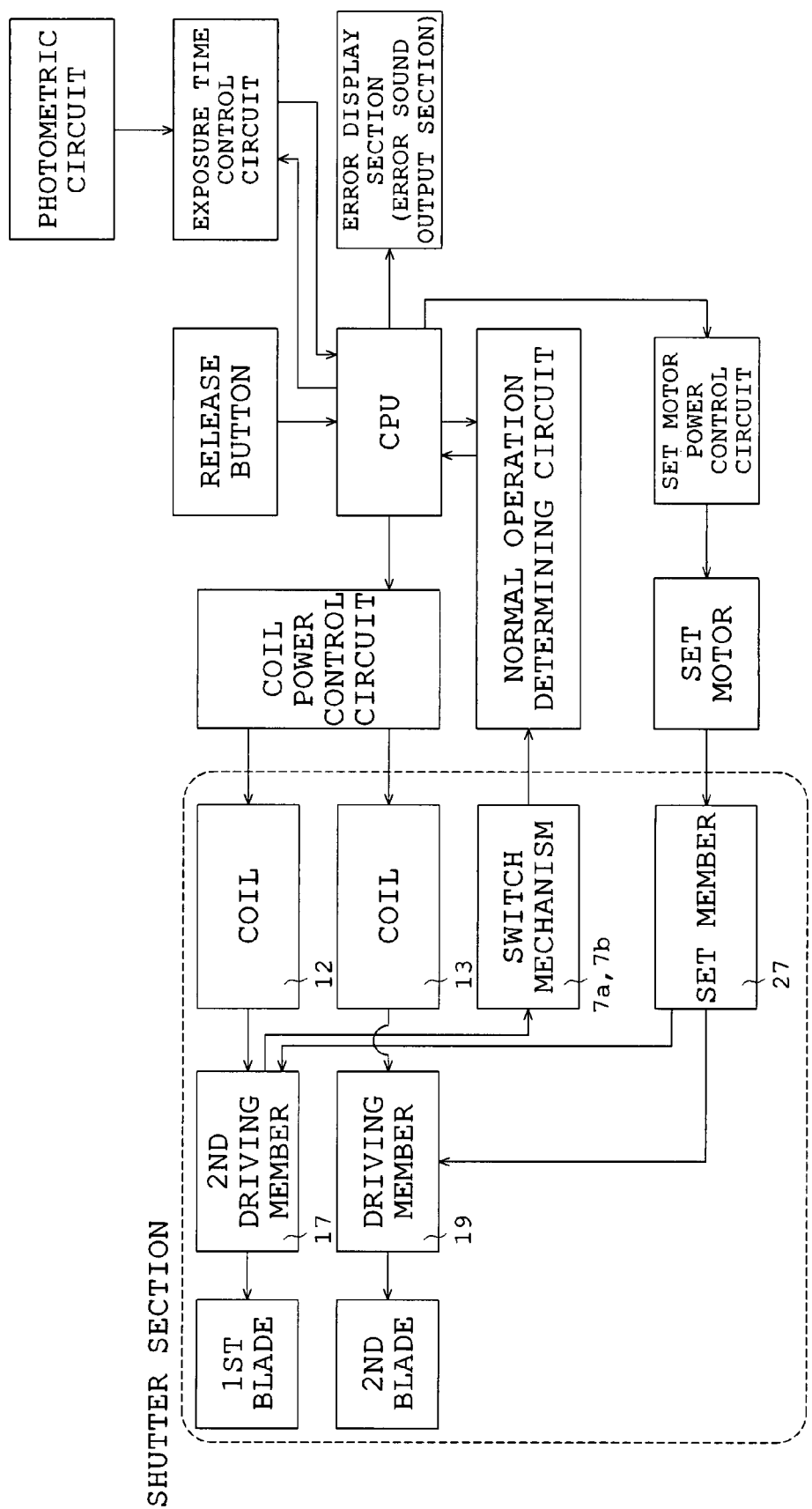
FIG. 12 is a block diagram serving to explain the actuation of Embodiment 1.
Figure 13:
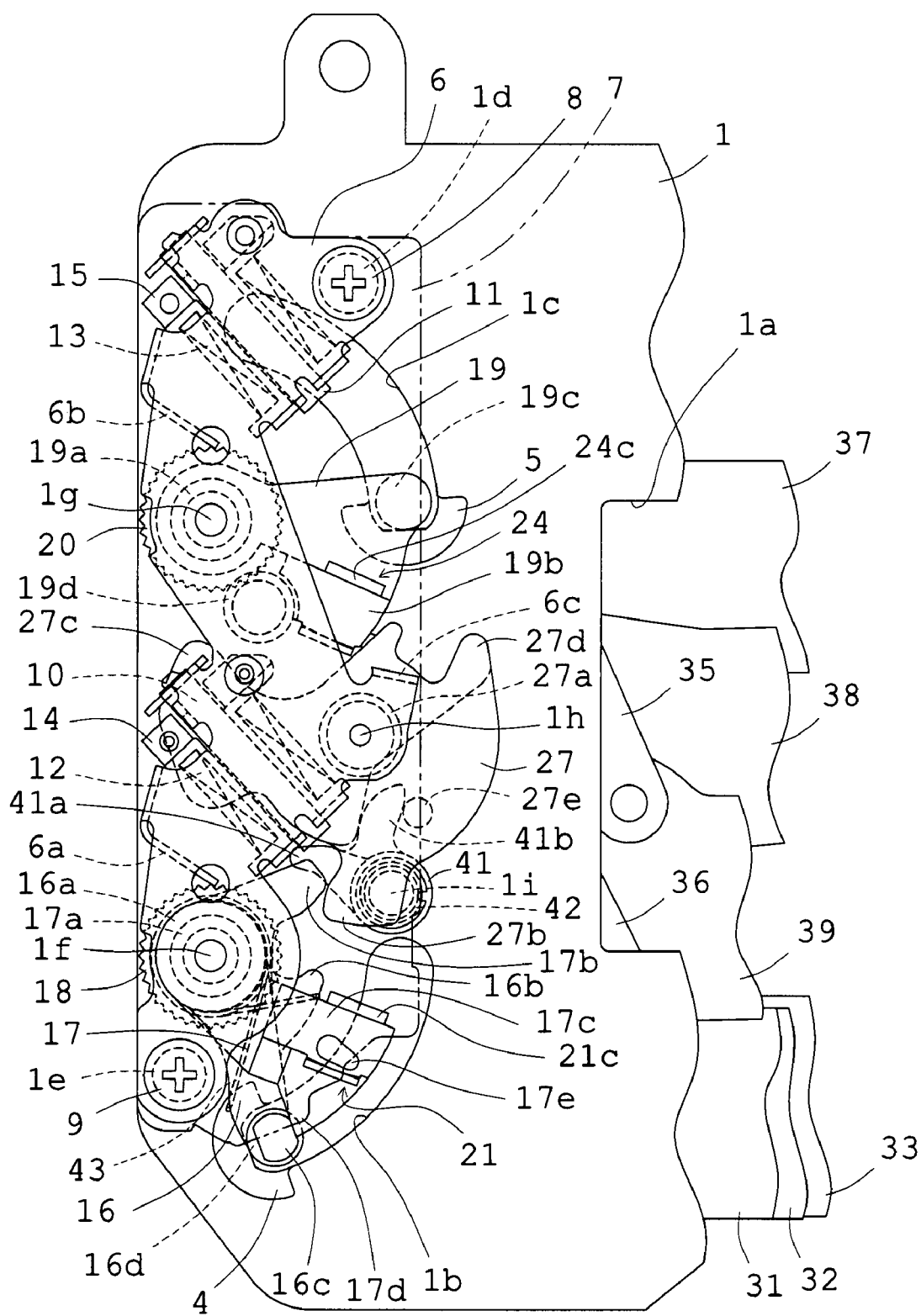
FIG. 13 is a plan view showing Embodiment 2 of the present invention in a state immediately after the completion of the exposure operation.
Figure 14:
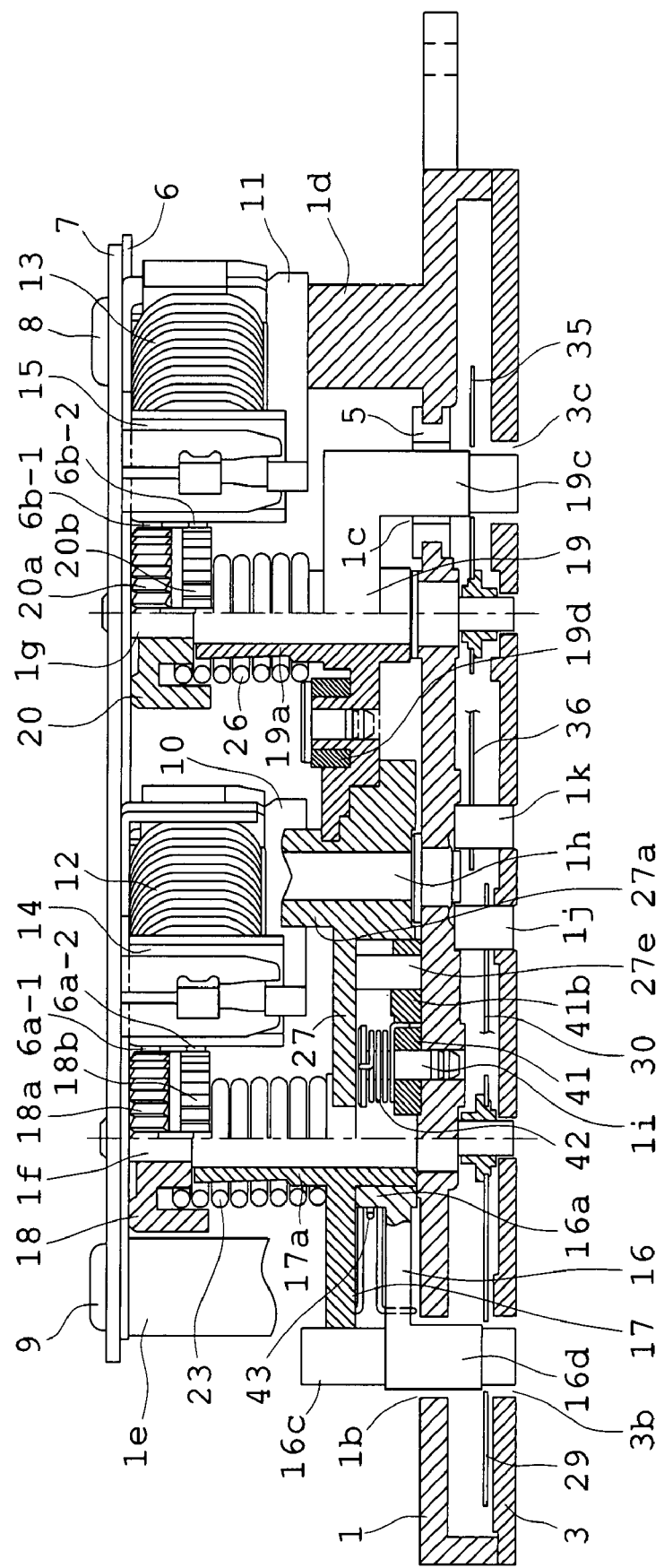
FIG. 14 is a sectional view showing the shutter viewed from the right side of FIG. 13 to facilitate the comprehension of components.

In accordance with two embodiments shown in the drawings, the present invention will be described below. FIGS. 1-12 are views for explaining Embodiment 1, and FIGS. 13 and 14 are views for explaining Embodiment 2.

Embodiment 1

Figure 1:
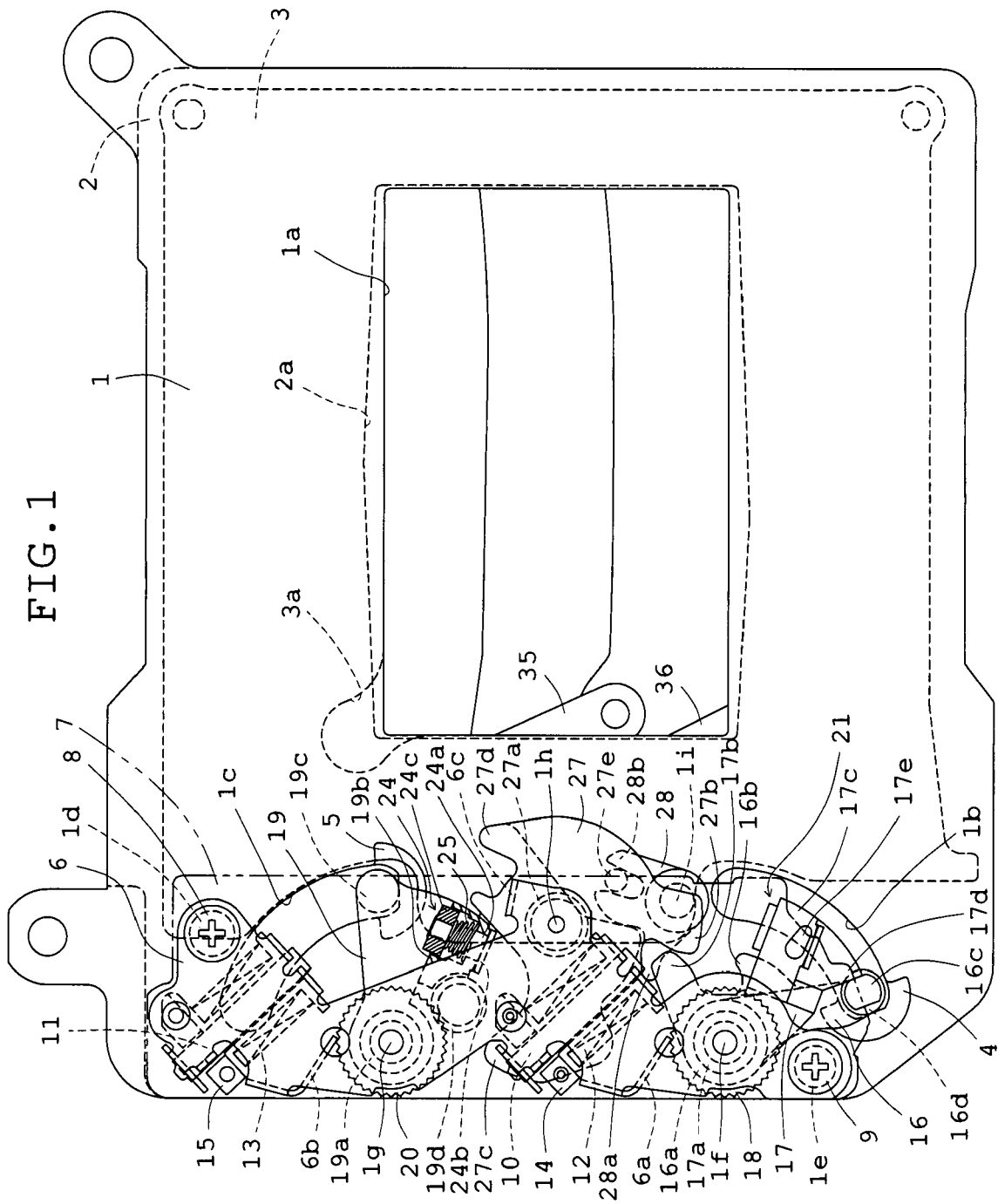
FIG. 1 is a plan view showing Embodiment 1 of the focal plane shutter for digital cameras of the present invention incorporated in a camera, viewed from the object side, in which the contour of a printed wiring board is indicated by a two-dotted chain line to facilitate a comprehension of a state immediately after the exposure operation is completed.
Figure 2:
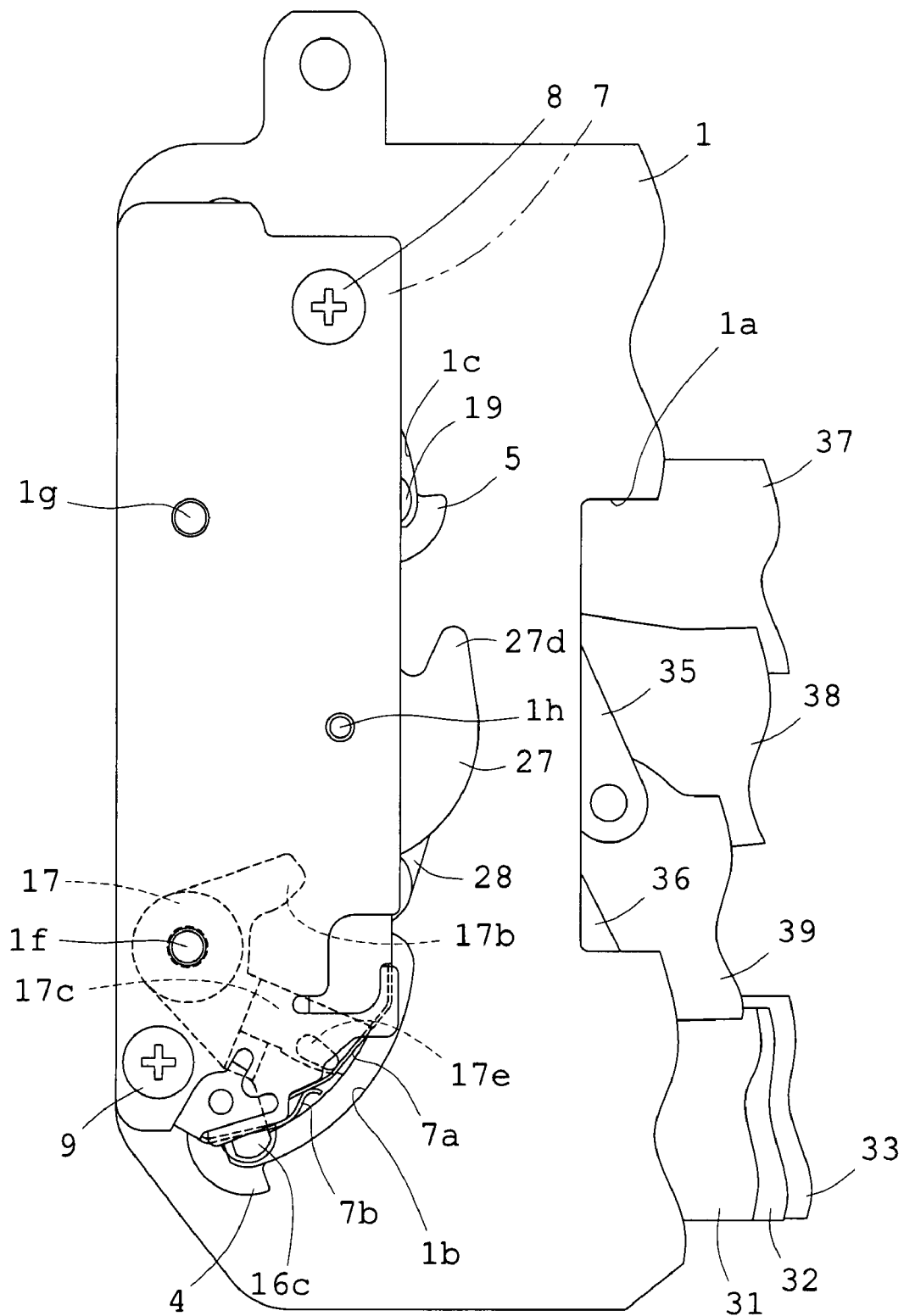
FIG. 2 is a plan view showing the printed wiring board and a switch mechanism attached thereto by enlarging a part of FIG. 1.
Figure 3:
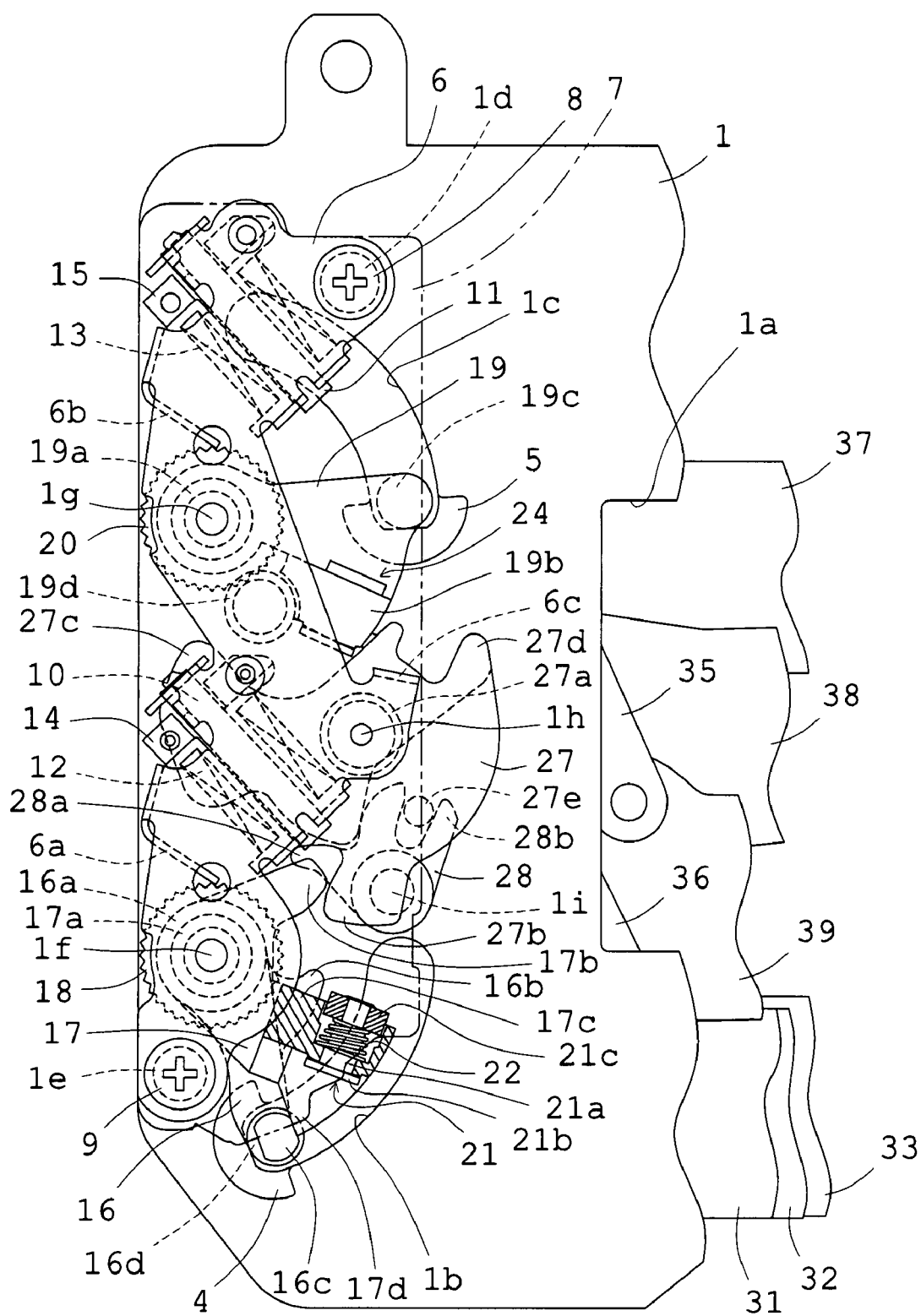
FIG. 3 is a plan view showing Embodiment 1 by enlarging a part of FIG. 1.
Figure 4:
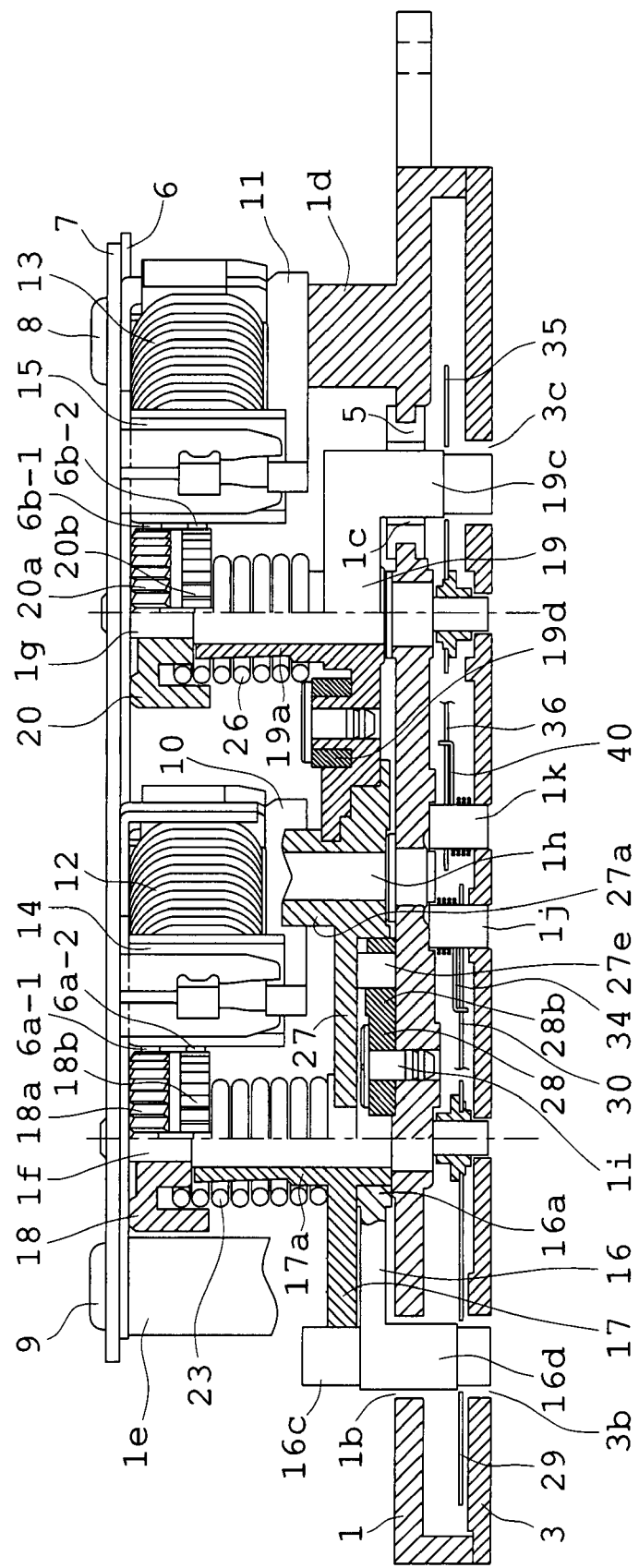
FIG. 4 is a sectional view showing the shutter viewed from the right side of FIGS. 2 and 3 to facilitate the comprehension of the overlapping relation of components.
Figure 5:
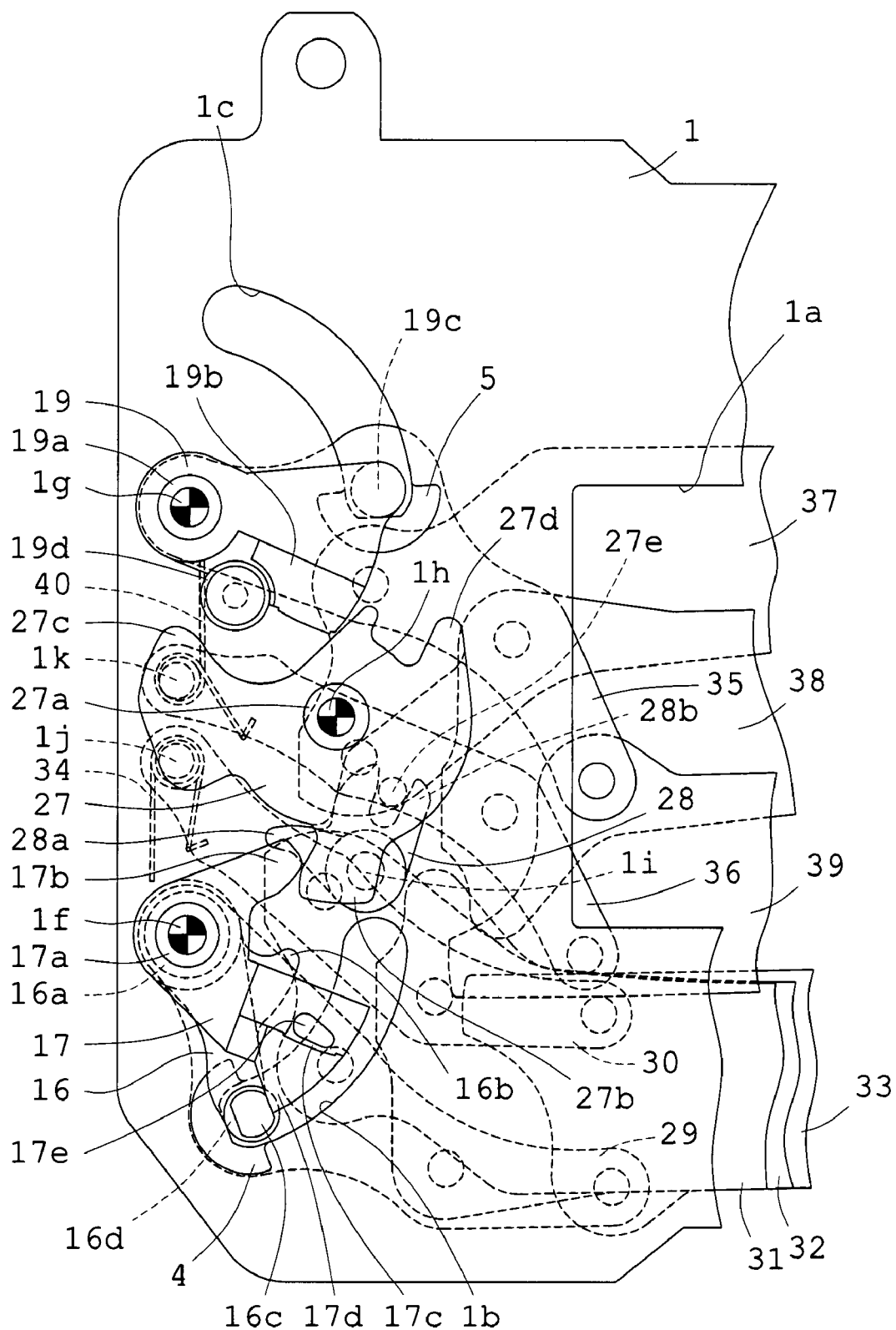
FIG. 5 is a plan view showing only main components necessary for the explanation of actuation of the components of FIG. 3.
Figure 6:
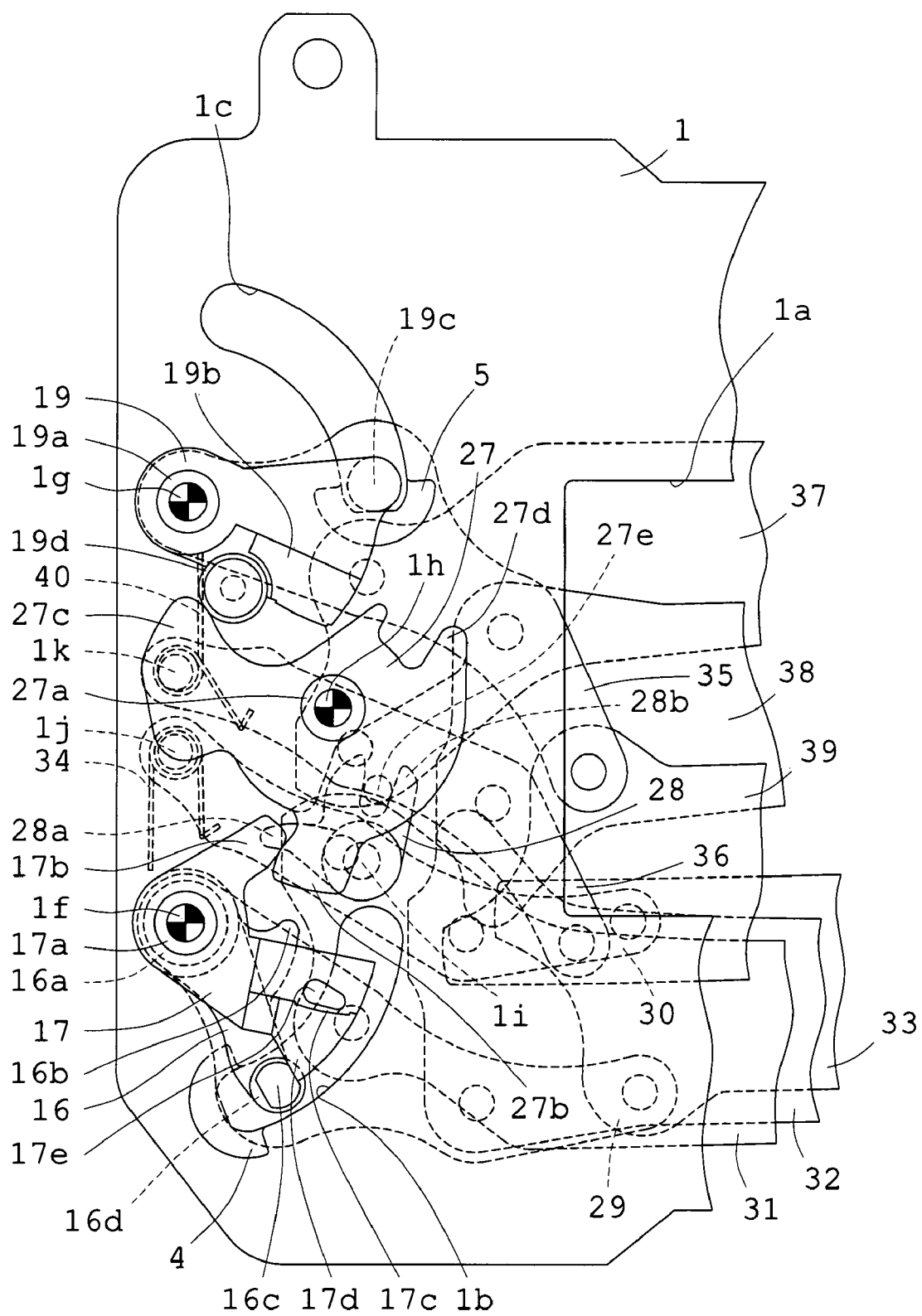
FIG. 6 is a plan view showing Embodiment 1 as in FIG. 5, in a state of the initial stage of the set operation.
Figure 7:
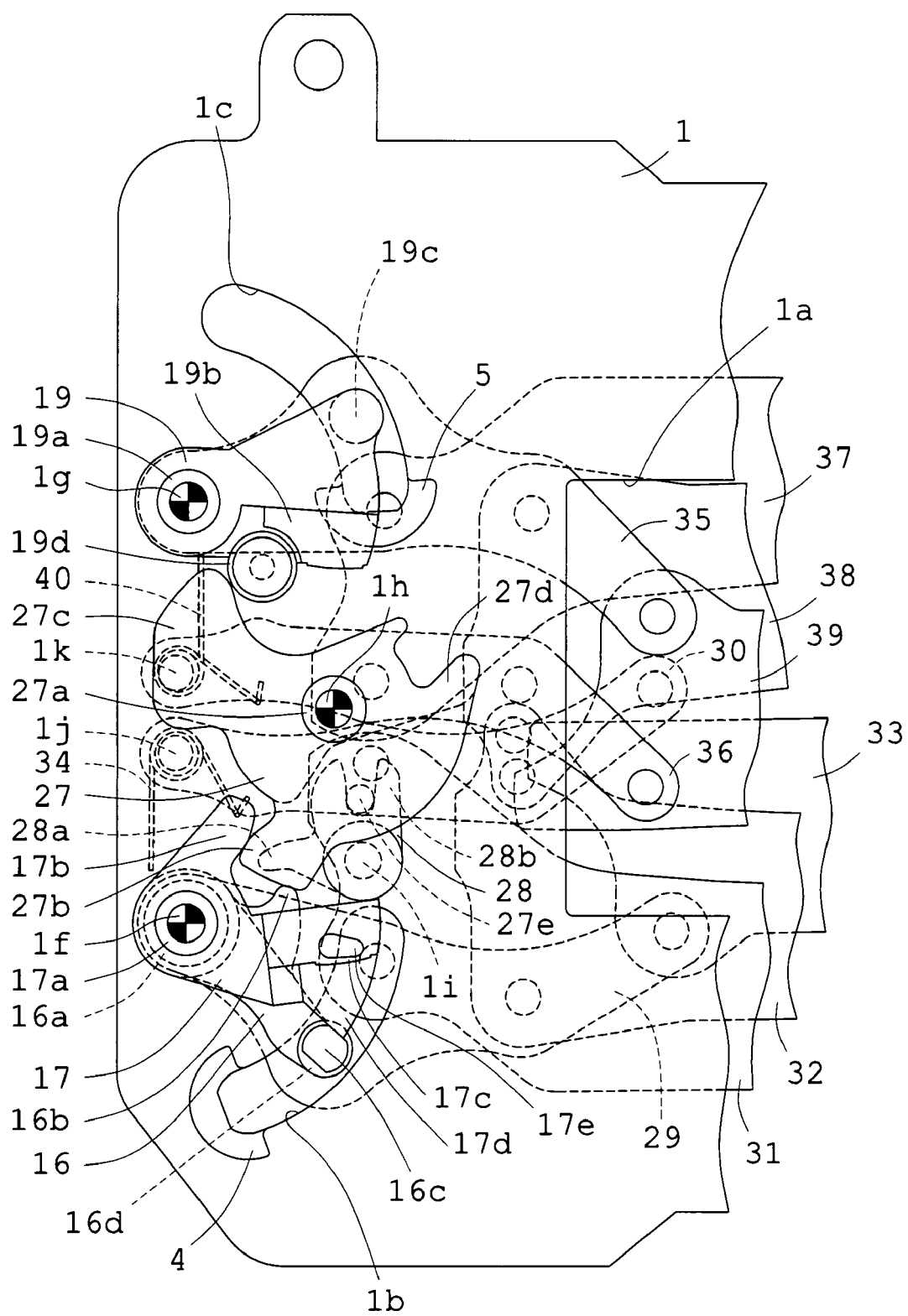
FIG. 7 is a plan view showing Embodiment 1 as in FIG. 5, in a more advanced state of the set operation than in FIG. 6.
Figure 8:
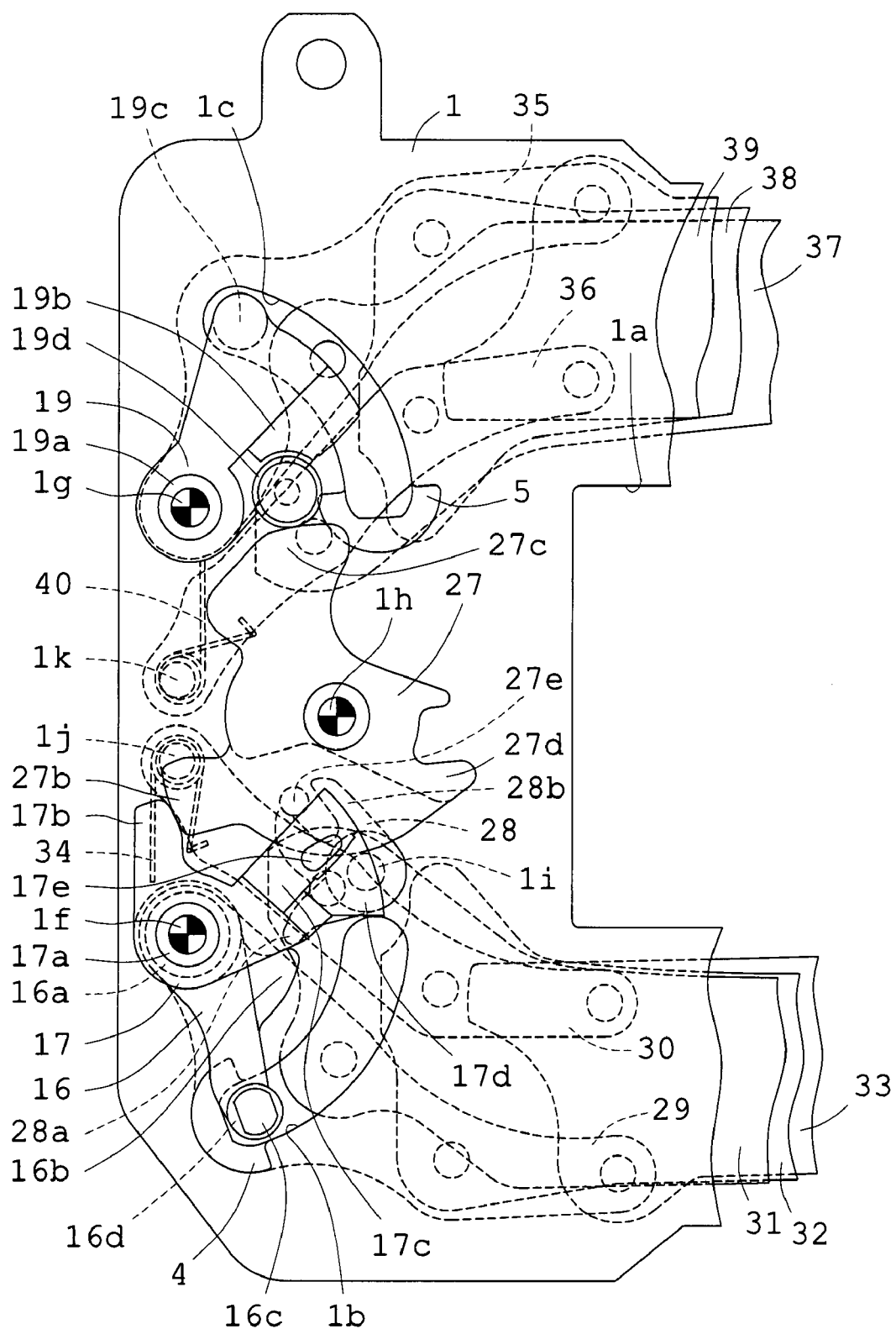
FIG. 8 is a plan view showing Embodiment 1 as in FIG. 5, in a state where the set operation is completed.
Figure 9:
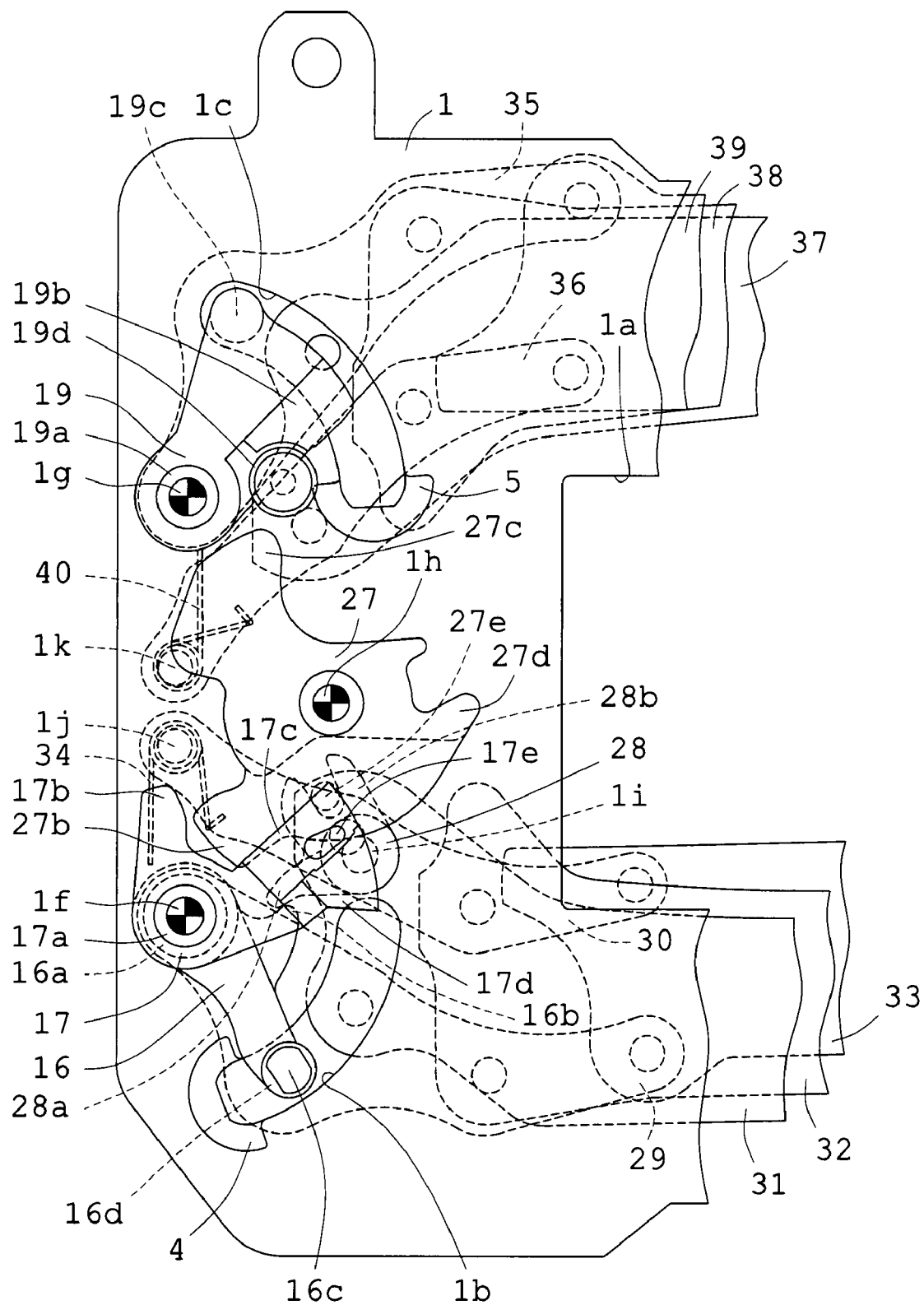
FIG. 9 is a plan view showing Embodiment 1 as in FIG. 5, in a state of the initial stage in which the set member is restored from the set position to the initial position prior to the exposure operation when the release button of the camera is pushed.
Figure 10:
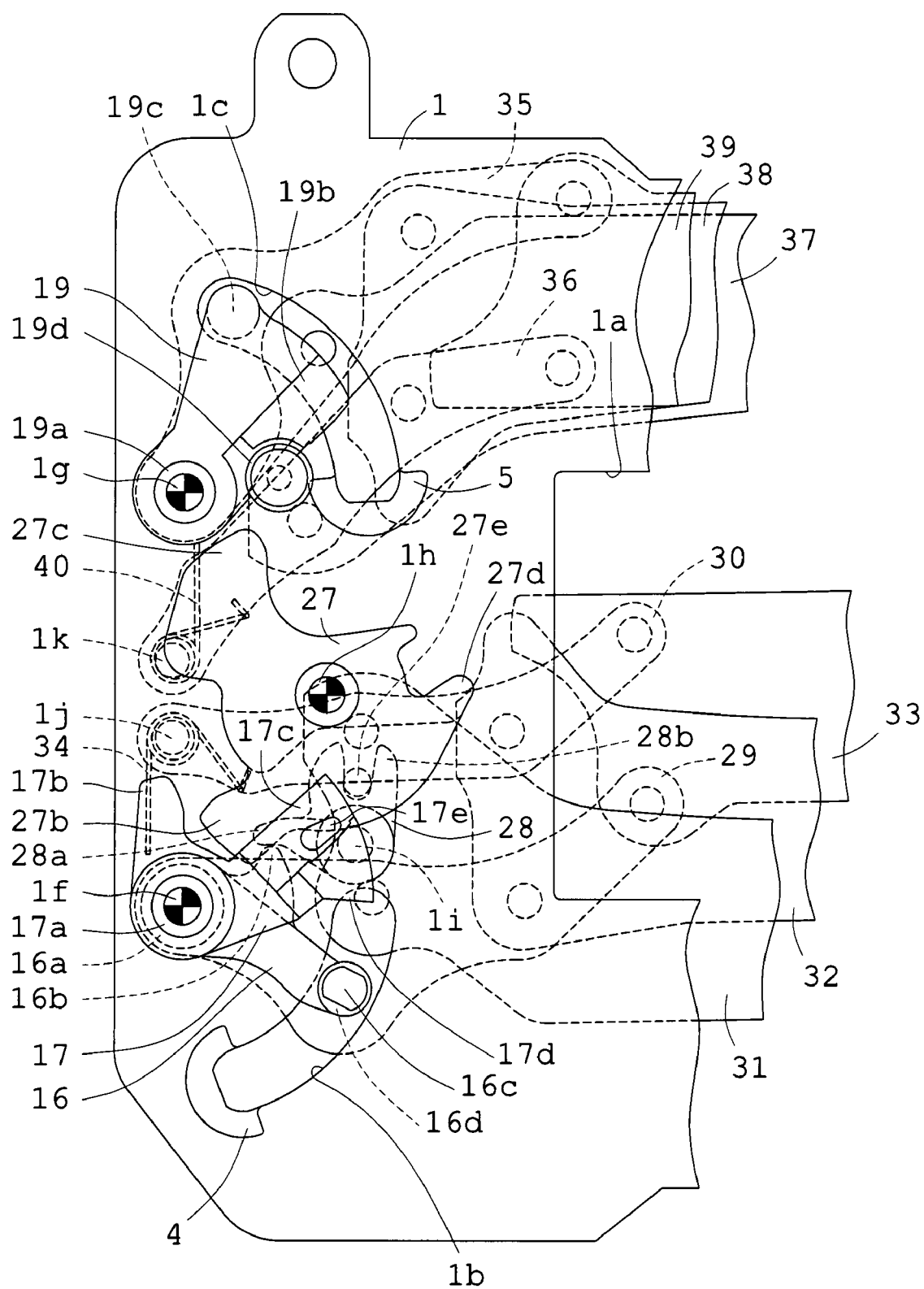
FIG. 10 is a plan view showing Embodiment 1 as in FIG. 5, in a more advanced state of the operation of restoration to the initial position of the set member than in FIG. 9.

FIG. 1 is a plan view showing Embodiment 1 of the focal plane shutter for digital cameras of the present invention incorporated in a camera, viewed from the object side, in which the contour of a printed wiring board is indicated by a two-dotted chain line to facilitate a comprehension of a state immediately after the exposure operation of components is completed, and FIG. 2 is a plan view showing the printed wiring board and a switch mechanism attached thereto by enlarging a part of FIG. 1. FIG. 3 is a plan view showing Embodiment 1 by enlarging a part of FIG. 1. FIG. 4 is a sectional view showing the shutter viewed from the right side of FIGS. 2 and 3 to facilitate the comprehension of the overlapping relation of components. FIGS. 5-11 are plan views showing only main components necessary for the explanation of actuation of components of FIG. 3. FIG. 5 shows a state immediately after the completion of the exposure operation as in FIG. 3. FIG. 6 shows a state of the initial stage of the set operation. FIG. 7 shows a more advanced state of the set operation than in FIG. 6. FIG. 8 shows a state where the set operation is completed. FIG. 9 shows a state of the initial stage in which the set member is restored from the set position to the initial position prior to the exposure operation when the release button of the camera is pushed. FIG. 10 shows a more advanced state of the operation of restoration to the initial position of the set member than in FIG. 9. FIG. 11 shows a state immediately before the start of the exposure operation in which the set member is stopped at the initial position. FIG. 12 is a block diagram serving to explain the actuation of Embodiment 1.

The structure of Embodiment 1 will be first explained, chiefly using FIGS. 1-4. FIG. 4 is shown to facilitate the comprehension of the overlapping relation of many components of FIGS. 1 and 3. In FIG. 1, at about the middle of a shutter base plate 1, a rectangular aperture section 1a for exposure is provided. On the back side of the shutter base plate 1, as is well known, an intermediate plate 2 and a cover plate 3 are mounted in turn at a preset distance to construct the blade chamber of a second blade between the shutter base plate 1 and the intermediate plate 2 and the blade chamber of a first blade between the intermediate plate 2 and the cover plate 3. In the intermediate plate 2 and the cover plate 3 as well, aperture sections 2a and 3a of shapes similar to the aperture section 1a are provided. In this embodiment, the shape of the aperture section 1a restricts an exposure aperture. Also, the intermediate plate 2 is not shown in FIGS. 2-4, and the cover plate 3 is omitted form FIGS. 2 and 3.

As is clearly shown in FIGS. 1 and 3, in a region on the left side of the aperture section 1a, two arcuate slots 1b and 1c are provided, and well-known shock absorbing members 4 and 5 made of rubber, each having a planar shape like a letter C, are mounted to lower ends of the slots. In the cover plate 3 as well, slots 3b and 3c (see FIG. 4) of nearly identical shapes are provided in regions overlapping with the slots 1b and 1c, respectively. On the shutter base plate 1, shafts 1d, 1e, 1f, 1g, 1h, 1i, 1j, and 1k are set upright. Of these shafts, the shafts 1d, 1e, 1h, and 1i are set upright on the front side of the shutter base plate 1, while the shafts 1j and 1k, as seen from FIG. 4, are set upright on the back side of the shutter base plate 1 so that their tops are inserted in holes provided in the cover plate 3. The shafts 1f and 1g, as seen from FIG. 4, pass through the shutter base plate 1 and are provided with shaft portions on both the front and back sides of the shutter base plate 1 so that tops of the shaft portions on the back side are inserted in holes provided in the cover plate 3. The shaft 1i, as seen from FIG. 4, is a shaft member having a disk-shaped head, whose top is forcedly fitted into a hole provided in the shutter plate 1.

At the tops of the shafts 1d and 1e, a thin metallic supporting plate 6 and a printed wiring board 7 are fastened with screws 8 and 9 by placing the supporting plate 6 on the shutter-base-plate-1 side of the printed wiring board 7. As shown in FIG. 2, two contact segment members 7a and 7b constituting the switch mechanism are attached to the printed wiring board 7. Each of these contact segment members 7a and 7b is flexible and has one end connected to a circuit pattern, not shown, provided on the printed wiring board 7, with the other end interposed between the shutter base plate 1 and the printed wiring plate 7 as a contact. In FIGS. 1 and 3, only the contour of the printed wiring board 7 is indicated by a two-dotted chain line.

The supporting plate 6 assumes a shape similar to "a mounting substrate" set forth in Japanese Patent Kokai No. Hei 9-133944 and has two ratchet pawls 6a and 6b configured as bending portions and a spring hook 6c so that an electromagnet for the first blade and an electromagnet for the second blade are mounted by a plurality of other bending portions. Of these bending portions, the two ratchet pawls 6a and 6b, as partially shown in FIG. 4, are configured with pawl parts 6a-1, 6a-2, 6b-1, and 6b-2, two for each pawl, at their tops. The electromagnet for the first blade and the electromagnet for the second blade have the same structure and include U-shaped iron core members 10 and 11, each having two legs, and bobbins 14 and 15 around which coils 12 and 13 are wound. In each of the iron core members 10 and 11, one leg is fitted into each of the bobbins 14 and 15, with the top of the leg as a magnetic pole.

In each of the shafts 1f and 1g, as seen from FIG. 4, the shaft portion on the front side of the shutter base plate 1 is provided with a major diameter part and a minor diameter part, and its top is inserted in holes provided in the supporting plate 6 and the printed wiring board 7. In the shaft 1f, a first driving member 16 for the first blade and a second driving member 17 for the first blade are rotatably mounted to the major diameter part provided on the side of the shutter base plate 1, while a ratchet member 18 is rotatably mounted to the minor diameter part provided on the side of the supporting plate 6. In the shaft 1g, a driving member 19 for the second blade is rotatably mounted to the major diameter part provided on the side of the shutter base plate 1, while a ratchet member 20 is rotatably mounted to the minor diameter part provided on the side of the supporting plate 6.

The second driving member 17 for the first blade has a cylinder 17a, a part 17b to be pressed, a mounting portion 17c, a pressing part 17d, and an operating part 17e (see FIGS. 1 and 2) provided on the printed-wiring-board-7 side of the mounting portion 17c so that the major diameter part provided to the shaft 1f is rotatably fitted into the cylinder 17a. The contact member 7a is brought into the track of actuation of the operating part 17e so that the contact member 7a, only when pressed by the operating part 17e, is brought into contact with the contact member 7b. As shown in FIG. 3 partially broken, an iron piece member 21 and a compression spring 22 are incorporated in the mounting portion 17c. In the iron piece member 21, a disk-shaped head 21b is provided at one end of a shaft portion 21a, and an iron piece part 21c is mounted at the other end and is biased to protrude from the mounting portion 17c by the compression spring 22 into which the shaft portion 21a is fitted.

The first driving member 16 for the first blade has a cylinder 16a, a part 16b to be restrained, a pin 16c to be pressed, and a driving pin 16d so that, as seen from FIG. 4, the periphery of the cylinder 17a of the second driving member 17 for the first blade is rotatably fitted into the cylinder 16a. The pin 16c to be pressed is provided on the side of the supporting plate 6 so that it can be pressed by the pressing part 17d of the second driving member 17 for the first blade. The driving pin 16d is provided on the side of the shutter base plate 1 and is inserted in the slot 1b of the shutter base plate 1. The driving pin 16d, as shown in FIG. 4, is configured so that the diameter of its root edge is somewhat larger than that of the top side, and is capable of abutting on the shock absorbing member 4. The part of the top side that is smaller in diameter, as will be described later, is connected to the first blade in the blade chamber, and its top is inserted in the slot 3b of the cover plate 3.

The ratchet member 18, as seen from FIG. 4, is configured with two ratchet teeth 18a and 18b along its periphery. These ratchet teeth 18a and 18b have the same pitch, but are out of phase by a half pitch so that the ratchet teeth 18a can be engaged with, and disengaged from, the pawl part 6a-1 of the ratchet pawl 6a, while the ratchet teeth 18b can be engaged with, and disengaged from, the pawl part 6a-2 of the ratchet pawl 6a. The cylinder 17a of the second driving member 17 for the first blade, as shown in FIG. 4, is loosely fitted into a driving spring 23 for the first blade so that one end of the spring is hooked on a spring hook, not shown, of the second driving member 17 for the first blade, while the other end is hooked on a spring hook, not shown, of the ratchet wheel 18, and in FIGS. 1 and 3, the second driving member 17 for the first blade is biased and rotated in a clockwise direction. As is generally known, the driving spring 23 for the first blade is designed so that its biasing force can be adjusted by changing the position of rotation of the ratchet wheel 18.

On the other hand, the driving member 19 for the second blade rotatably mounted to the shaft 1g has a cylinder 19a, a mounting portion 19b, and a driving pin 19c so that a roller 19d is rotatably mounted and the major diameter part of the shaft 1g is rotatably fitted into the cylinder 19a. As shown in FIG. 1 partially broken, an iron piece member 24 and a compression spring 25 are incorporated in the mounting portion 19b. In the iron piece member 24, as in the iron piece member 21, a disk-shaped head 24b is provided at one end of a shaft portion 24a, and an iron piece part 24c is mounted at the other end and is biased to protrude from the mounting portion 19b by the compression spring 25 into which the shaft portion 24a is fitted. The driving pin 19c is provided on the shutter-base-plate-1 side and is inserted in the slot 1c of the shutter base plate 1. As shown in FIG. 4, the driving pin 19c, like the driving pin 16d, is configured so that the diameter of its root edge is somewhat larger than that of the top side, and is capable of abutting on the shock absorbing member 5. The part of the top side that is smaller in diameter, as will be described later, is connected to the second blade in the blade chamber, and its top is inserted in the slot 3c of the cover plate 3.

The ratchet member 20, as seen from FIG. 3, has the same shape as the ratchet member 18 and is configured with two ratchet teeth 20a and 20b along its periphery. These ratchet teeth 20a and 20b have the same pitch, but are out of phase by a half pitch so that the ratchet teeth 20a can be engaged with, and disengaged from, the pawl part 6b-1 of the ratchet pawl 6b, while the ratchet teeth 20b can be engaged with, and disengaged from, the pawl part 6a-2 of the ratchet pawl 6b. The cylinder 19a of the driving member 19 for the second blade, as shown in FIG. 4, is loosely fitted into a driving spring 26 for the second blade so that one end of the spring is hooked on a spring hook, not shown, of the driving member 19 for the second blade, while the other end is hooked on a spring hook, not shown, of the ratchet wheel 20, and in FIGS. 1 and 3, the driving member 19 for the second blade is biased and rotated in a clockwise direction. As is generally known, the driving spring 26 for the second blade is designed so that its biasing force can be adjusted by changing the position of rotation of the ratchet wheel 20.

A set member 27 is rotatably mounted to the shaft 1h set upright on the shutter base plate. The set member 27 has a cylinder 27a, pressing parts 27b and 27c, a part 27d to be pressed, and a projection 27e and causes the shaft 1h to be rotatably fitted into the cylinder 27a. The pressing part 27b is provided to press the part 17b to be pressed of the second driving member 17 for the first blade, the pressing part 27c is provided to press the roller 19d of the driving member 19 for the second blade, and the part 27d to be pressed is provided to be pressed by a member of a camera body, not shown. The projection 27e is provided on the shutter-base-plate-1-side surface of the set member 27, and in the embodiment, it is configured into a cylindrical shape. The cylinder 27a is loosely fitted into a restoring spring, not shown, so that one end of the spring is hooked on a spring hook, not shown, of the set member 27, while the other end is hooked on the spring hook 6c of the supporting plate 6, and in FIGS. 1 and 3, the set member 27 is biased and rotated in a counterclockwise direction. FIGS. 1 and 3 show a state where a pin, not shown, provided on the shutter-base-plate-1-side surface of the set member 27 abuts on a stopper, not shown, provided on the shutter base plate 1 and thereby the counterclockwise rotation of the set member 27 by the biasing force of the restoring spring is stopped. For the set member 27, this position is hereinafter referred to as an initial position.

A restraining member 28 is rotatably mounted to the shaft 1i set upright on the shutter base plate 1. This restraining member 28 has a restraining part 28a and an engaging part 28b. With the exception of cases where the set member 27 is located at the initial position and where it is located in the proximity of the initial position, the restraining part 28a is brought into the track of actuation of the part 16b to be restrained of the first driving member 16 for the first blade. The engaging part 28b is configured into a forked shape to hold the projection 27e provided on the set member 27. Consequently, in FIGS. 1 and 3, when the set member 27 is rotated in the clockwise direction, the engaging part 28b is pressed by the projection 27e so that the restraining member 28 is rotated in the counterclockwise direction. After that, when the set member 27 is rotated in the counterclockwise direction, the engaging part 28b is pressed by the projection 27e so that the restraining member 28 is rotated in the clockwise direction.

Subsequently, the structures of the first blade and the second blade arranged on the back side of the shutter base plate 1 will be explained, chiefly using FIG. 5. Also, the supporting plate 6, the printed wiring board 7, two electromagnets, the two ratchet members 18 and 20, the two iron piece members 21 and 24, and the two compression springs 22 and 25 that are shown in FIGS. 1 and 3 are omitted from FIGS. 6-11 as well as from FIG. 5. The first blade includes, on the back side of the shutter base plate 1, an arm 29 rotatably mounted to the shaft 1f, an arm 30 rotatably mounted to the shaft 1j, and three blade components 31, 32, and 33 pivotally supported in turn toward the tops of these arms, and the blade component 33 constitutes a slit-forming blade component for the first blade. As is well known, the top of the driving pin 16d of the first driving member 16 for the first blade is fitted into a hole provided in the arm 29. The shaft 1j of the shutter base plate 1 is fitted into a set spring 34 so that one end of the spring is hooked on a spring hook, not shown, provided to the shutter base plate 1, while the other end is hooked on the arm 30, and the arm 30 is biased and rotated in the counterclockwise direction.

On the other hand, the second blade includes, on the back side of the shutter base plate 1, an arm 35 rotatably mounted to the shaft 1g, an arm 36 rotatably mounted to the shaft 1k, and three blade components 37, 38, and 39 pivotally supported in turn toward the tops of these arms, and the blade component 39 constitutes a slit-forming blade component for the first blade. The top of the driving pin 19c of the driving member 19 for the second blade, as is generally known, is fitted into a hole provided in the arm 35. In addition, the shaft 1k of the shutter base plate 1 is fitted into a spring 40 so that one end of the spring is hooked on a spring hook, not shown, provided to the shutter base plate 1, while the other end is hooked on the arm 36, and the arm 36 is biased and rotated in the counterclockwise direction. Also, in FIG. 4, the three blade components 31-33 of the first blade and the three blade components 37-39 of the second blade are omitted.

Subsequently, the operation of the embodiment will be explained, chiefly using FIGS. 5-12. In FIGS. 5-11, as mentioned above, the components of the embodiment explained chiefly using FIGS. 1-4 are partially omitted. FIG. 5 shows a stopped state immediately after the exposure operation of the shutter shown in FIGS. 1 and 3 is completed. At this time, the second driving member 17 for the first blade is rotated in the clockwise direction, together with the first driving member 16 for the first blade, by the biasing force of the driving spring 23 for the first blade, and the driving pin 16d of the first driving member 16 for the first blade abuts on the shock absorbing member 4, thereby maintaining the stopped state. In this case, the three blade components 31-33 of the first blade are made to overlap and are housed at a position located below the aperture section 1a. At this time, as shown in FIG. 2, the operating part 17e of the second driving member 17 for the first blade presses the contact member 7a, which is brought into contact with the contact member 7b. A normal operation determining circuit of the embodiment shown in FIG. 12 is such that when the release button of the camera is pushed in photography, signal processing can be performed for a preset time by a signal from a CPU, but at this stage, the preset time is already passed, and signals of the contact members 7a and 7b constituting the switch mechanism are neglected.

On the other hand, the driving member 19 for the second blade is rotated in the clockwise direction by the biasing force of the driving spring 26 for the second blade, and driving pin 19c abuts on the shock absorbing member 5, thereby maintaining the stopped state. Consequently, the three blade components 37-39 of the second blade is spread to cover the aperture section 1a. In this case, the set member 27 are situated at the initial position so that the restraining member 28 is rotated in the clockwise direction by the projection 27a, and the restraining part 28a of the restraining member 28 is brought outside the track of actuation of the part 16b to be restrained of the first driving member 16 for the first blade. The pressing part 27b of the set member 27 is separated from the part 17b to be pressed of the second driving member 17 for the first blade, and the pressing part 27c is separated from the roller 19d of the driving member 19 for the second blade.

In such a state where the exposure operation is completed, when imaging information is transferred to a memory device, not shown, a set motor power control circuit rotates a set motor by preset time in accordance with a signal from the CPU shown in FIG. 12 and immediately the set operation is started. In the embodiment, when the set motor is rotated, a member of the camera body, not shown, actuated by the rotation of the motor presses the part 27d to be pressed of the set member 27 to rotate the set member 27 in the clockwise direction against the biasing force of the restoring spring, not shown. Whereby, the engaging part 28b is pressed by the projection 27e of the set member 27 and the restraining member 28 is also rotated in the counterclockwise direction so that the restraining part 28a is brought into the track of actuation of the part 16b to be restrained of the driving member 16 for the first blade.

When the set member 27 and the restraining member 28 start to rotate in this way, the pressing part 27b of the set member 27 first presses the part 17b to be pressed of the second driving member 17 for the first blade and starts to rotate the second driving member 17 for the first blade in the counterclockwise direction against the biasing force of the driving spring 23 for the first blade. By this, the operating part 17e of the second driving member 17 for the first blade is separated from the contact member 7a and then contact between the two contact members 7a and 7b is released, but off signals in this case, as mentioned above, are also neglected by the normal operation determining circuit shown in FIG. 12. Also, when the second driving member 17 for the first blade is rotated in the counterclockwise direction in this way, a force for rotating the first driving member 16 for the first blade in the counterclockwise direction through the first blade by the set spring 34 is imparted to the first driving member 16 for the first blade. Hence, the pin 16c to be pressed follows up the pressing part 17d of the second driving member 17 for the first blade, and the first driving member 16 for the first blade also starts the counterclockwise rotation. After that, when the slit-forming blade component 33 of the first blade begins to cover the aperture section 1a, the pressing part 27c of the set member 27 starts to press the roller 19d of the driving member 19 for the second blade. FIG. 6 illustrates this state.

When the set member 27 is further rotated in the clockwise direction from the state of FIG. 6, the driving member 19 for the second blade is also rotated in the counterclockwise direction against the biasing force of the driving spring 26 for the second blade. By this, the driving pin 19c of the driving member 19 for the second blade rotates the arm 35 of the second blade in the counterclockwise direction, and hence the three blade components 37-39 of the second blade are moved upward. In this way, an intermediate state where the three blade components 31-33 of the first blade are moved upward while reducing overlapping of adjacent blade components and the three blade components 37-39 are moved upward while increasing overlapping of adjacent blade components is illustrated in FIG. 7.

As will be seen from comparison between FIGS. 6 and 7, in a state of FIG. 7, a distance between the restraining part 28a of the restraining member 28 and the part 16b to be restrained of the first driving member 16 for the first blade is reduced. As a result, when the restraining member 28 and the first driving member 16 for the first blade are rotated further in the counterclockwise direction than in a state of FIG. 7, the restraining part 28a and the part 16b to be restrained come in contact with each other. In this case, a force for rotating the set member 27 is greater than the biasing force of the set spring 34, and thus after contact between both, the restraining part 28a presses the part 16b to be restrained against the biasing force of the set spring 34. After that, therefore, the second driving member 17 for the first blade is rotated in the counterclockwise direction, as usual, by the set member 27, whereas the first driving member 16 for the first blade is rotated in the clockwise direction, so that the three blade components 31-33 of the first blade is returned to the position located below the aperture section 1a while increasing overlapping of adjacent blade components. When the slit-forming blade component 33 of the first blade is removed from the aperture section 1a, the slit-forming blade component 39 of the second blade is also removed from the aperture section 1a so that the aperture section 1a is fully opened.

When the aperture section 1a is fully opened in this way, the iron piece parts 21c and 24c of the iron members 21 and 24 attached to the second driving member 17 for the first blade and the driving member 19 for the second blade come in almost simultaneous contact with the iron core members 10 and 11 of the electromagnet for the first blade and the electromagnet for the second blade, respectively. Immediately after this, the rotation of the set member 27 is stopped and the rotation of the driving members 16, 17, and 19 is also stopped. Consequently, in stopped states of the second driving member 17 for the first blade and the driving member 19 for the second blade, the iron piece parts 21c and 24c of the iron core member 21 and 24 are pushed into the mounting portions 17c and 19b, from a state of FIG. 3, against the biasing forces of the compression springs 22 and 25, and the heads 21b and 24b located on the opposite side are separated from the mounting portions 17c and 19b. This state is the one of the set completion shown in FIG. 8, and the set member 27 is retained at this set position until the next photography is performed. Unless the power source of the camera is turned off in this state where the set operation is completed, a wait state of the next photography is brought about and thus it becomes possible to observe an image of an object formed on the image sensor though a monitor such as a liquid crystal display device.

In the next photography, when the release button of the camera is pushed, three signals are generated simultaneously from the CPU shown in FIG. 12. A coil power control circuit is such that the coils 12 and 13 of the electromagnet for the first blade and the electromagnet for the second blade are energized and the iron piece members 21 and 24 are attracted and held to the iron core members 10 and 11 at a electromagnetic forces. The normal operation determining circuit functions by preset time. An exposure time control circuit starts the count of time according to the luminance of the object by a photometric circuit. When the iron piece members 21 and 24 are attracted and held to the iron core members 10 and 11, the set motor power control circuit rotates the set motor by a preset time in accordance with the signal from the CPU and releases pressure applied to the part 27d to be pressed of the set member 27 by the member of the camera body, not shown. Consequently, the set member 27 is rotated in the counterclockwise direction by the biasing force of a restoring spring, not shown, from a state of FIG. 8 and is restored to the initial position.

At the initial stage of this restoration operation, the set member 27 is such that the pressing part 27b is separated from the part 17b to be pressed of the second driving member 17 for the first blade, and the pressing part 27c is separated from the roller 19d of the driving member 19 for the second blade. Since the restraining member 28 is rotated in the clockwise direction by the set member 27, the part 16b to be restrained follows up the restraining part 28c of the restraining member 28 and the first driving member 16 for the first blade is rotated in the counterclockwise direction by the biasing force of the set spring 34. A state where the three blade components 31-33 of the first blade begin to cover the aperture section 1a in this way is illustrated in FIG. 9.

In a state of FIG. 9, the set member 27 is separated and thereby the second driving member 17 for the first blade and the driving member 19 for the second blade are slightly rotated in the clockwise direction by the biasing forces of the driving springs 23 and 26 and of the compression springs 22 and 25, as compared with the set position shown in FIG. 8, so that the mounting portions 17c and 19b are brought into contact with the heads 21b and 24b of the iron piece members 21 and 24. The situation shown in FIG. 9 is the starting position of the exposure operation for the second driving member 17 for the first blade and the driving member 19 for the second blade. This is also the starting position of the exposure operation for the second blade connected to the driving member 19 for the second blade.

The second blade, as is well known, is designed so that the three blade components 37-39 are rotatably mounted to the two arms 35 and 36, at six places in total. Since these mounting places are provided with tolerances, the position of the slit-forming blade component 39 at the starting position of the exposure operation is slightly shifted, depending on the holding way of the camera in photography, and sometimes the preset exposure time ceases to be stably obtainable. In the embodiment, therefore, provisions are made for always imparting the biasing force of the counterclockwise rotation to the arm 36 by the spring 40 of a weaker biasing force than the driving spring 26 for the second blade so that the slit-forming blade component 39 is capable of always starting the exposure operation from the same position in photography. In this way, the provision for the spring 40 is well known, and in the embodiment, the arm 36 is biased so that it is rotated in the counterclockwise direction, but it is known that even when the arm 36 is biased so that it is rotated in the clockwise direction, the same effect is brought about.

When the set member 27 is further rotated in the counterclockwise direction from the position of FIG. 9, the restraining member 28 is also further rotated in the clockwise direction and thus the first driving member 16 for the first blade is further rotated in the counterclockwise direction by the biasing force of the set spring 34. A state where the three blade components 31-33 of the first blade cover about ⅔ of the aperture section 1a in this way is illustrated in FIG. 10. At this time, the pin 16c to be pressed of the first driving member 16 for the first blade fairly approaches the pressing part 17d of the second driving member 17 for the first blade. After that, when the three blade components 31-33 of the first blade almost completely cover the aperture section 1a, the restraining member 28 is further rotated in the clockwise direction and thereby the restraining part 28a deviates from the track of actuation of the part 16b to be restrained of the first driving member 16 for the first blade. Consequently, the first driving member 16 for the first blade is more quickly rotated than ever before and the pin 16c to be pressed abuts on the pressing part 17d of the second driving member 17 for the first blade and is stopped. A state where, after that, the set member 27 is restored to the initial position and is stopped is illustrated in FIG. 11, and this situation is the starting position of the exposure operation for the first driving member 16 for the first blade and the first blade.

The embodiment is designed so that, in accordance with the operation of restoration to the initial position of the set member 27, a restraining position by the restraining member 28 is shifted and the first driving member 16 for the first blade is rotated in the counterclockwise direction. In this case, the speeds of rotation of set member 27 and the restraining member 28 are different. As described in Kokai Nos. 2001-222059 and 2003-222928, when the restraint of the first driving member 16 for the first blade is released in the proximity of the position where the exposure operation is completed, a shock where the pin 16c to be pressed abuts on the pressing part 17d becomes severe and the second driving member 17 for the first blade is slightly actuated, with the result that sometimes the compression spring 22 is temporarily compressed. In such a case, the second driving member 17 for the first blade may encounter the case where the head 21b of the iron piece member 21 is struck by the mounting portion 17c in the restoration operation after that to separate the iron piece part 21c from the iron core member 10 against the attractive force of the iron core member 10.

In the embodiment, however, the release of the restraint from the first driving member 16 for the first blade is obtained when the pin 16c to be pressed of the first driving member 16 for the first blade approaches the pressing part 17d of the second driving member 17 for the first blade. Hence, the angle of rotation of the first driving member 16 for the first blade after the restraint is released is small, and thus even though the pin 16c to be pressed abuts on the pressing part 17d, its shock is extremely slight and does not entirely affect a state of attraction of the iron piece member 21 to the iron core member 10. In addition, even when the pin 16c to be pressed abuts on the pressing part 17d, the first driving member 16 for the first blade is little bounded, and therefore when the set member 27 is restored to the initial position and is stopped, the first driving member 16 for the first blade and the first blade already rest so that the exposure operation can be started at any time.

In the embodiment, the first blade is also designed so that the three blade components 31-33 are rotatably mounted to the two arms 29 and 30, at six places in total. Thus, as in the case of the second blade, the position of the slit-forming blade component 33 at the starting position of the exposure operation shown in FIG. 11 is shifted, depending on the way of holding the camera in photography, and sometimes the preset exposure time ceases to be stably obtainable. However, the set spring 34 of the embodiment has a function of actuating the first driving member 16 for the first blade and the first blade toward the starting position of the exposure operation as mentioned above and also has the same function as the spring 40. As such, the first blade is also designed so that the slit-forming blade component 33 is capable of always starting the exposure operation from the same position in photography.

As shown in FIG. 11, when the set member 27 is stopped at the initial position, the CPU shown in FIG. 12 relays a signal from the exposure time control circuit and transmits it to the coil power control circuit so that power to the coil 12 of the electromagnet for the first blade is disconnected. After that, when the count according to the luminance of the object is ended by the exposure time control circuit, the CPU transmits an end signal to the coil power control circuit so that power to the coil 13 of the electromagnet for the second blade is disconnected. When power to the coil 12 of the electromagnet for the first blade is first disconnected, the force of attraction of the iron core member 10 to the iron piece member 21 is lost and the second driving member 17 for the first blade is rapidly rotated in the clockwise direction by the biasing force of the driving spring 23 for the first blade. At this time, the pressing part 17d presses the pin 16c to be pressed and rotates the first driving member 16 for the first blade in the clockwise direction against the biasing force of the set spring 34. Consequently, the three blade components 31-33 of the first blade are moved downward while increasing overlapping of adjacent blade components to open the aperture section 1a with the upper end of the slit-forming blade component 33.

On the other hand, when power to the coil 13 of the electromagnet for the second blade is disconnected, the force of attraction of the iron core member 11 to the iron piece member 24 is lost and the driving member 19 for the second blade is rapidly rotated in the clockwise direction by the biasing force of the driving spring 26 for the second blade. As a result, the three blade components 37-39 for the second blade are moved downward while reducing overlapping of adjacent blade components to cover the aperture section 1a with the lower end of the slit-forming blade components 39. After that, as mentioned above, the first blade and the second blade continuously expose the imaging surface of the image sensor, from top to bottom, through a slit formed between the slit-forming blade components 31 and 39.

At the final stage of the exposure operation, the operating part 17e of the second driving member 17 for the first blade presses the contact member 7a of the switch mechanism shown in FIG. 2 and brings the contact member 7a into contact with the contact member 7b to generate an on signal. Thus, the normal operation determining circuit shown in FIG. 12 recognizes that the exposure operation of the first blade is normally performed in accordance with the on signal, and transmits this fact to the CPU. In this way, immediately after the switch mechanism generates the on signal, the driving pin 16d of the first driving member 16 for the first blade abuts on the shock absorbing member 4, and the operations of the two driving members 16 and 17 for the first blade and the first blade are stopped. Further, immediately after this, the driving pin 19c of the driving member 19 for the second blade abuts on the shock absorbing member 5, and the operations of the driving member 19 for the second blade and the second blade are also stopped, bringing about a state shown in FIGS. 1-3 and 5. In this state, since a preset time passes after the signal from the CPU is sent, signal detection by the normal operation determining circuit ceases to be made. Further, it follows from this state that the imaging information of the object is transferred from the image sensor to the memory device and thereby photography is completed.

The above description of the operation refers to the case where the exposure operation is normally performed by the first blade and the second blade. Thus, a case where the exposure operation of the first blade is not normally performed will be described below, simplifying the repetition of the above description. The process followed until a state of FIG. 11 is reached after the release button of the camera is pushed in a state of FIG. 8 is exactly the same as the above case. When the set member 27, as shown in FIG. 11, is restored to the initial position and is stopped, the CPU of FIG. 12 transmits the signal from the exposure time control circuit to the coil power control circuit, and power to the coil 12 of the electromagnet for the first blade is to be disconnected. However, for some reason or other, when the signal is not transmitted to the coil power control circuit or when it is transmitted and the coil power control circuit does not function normally, it follows from this that power to the coil 12 of the electromagnet for the first blade is not disconnected.

In such a case, the second driving member 17 for the first blade cannot start the operation in preset timing and remains at the starting position of the exposure operation, together with the first driving member 16 for the first blade and the first blade. On the other hand, when the count end signal by the exposure time control circuit is normally transmitted to the coil power control circuit through the CPU and the coil power control circuit is normally operated with respect to the signal, power to the coil 13 of the electromagnet for the second blade is disconnected and the driving member 19 for the second blade starts a normal operation as mentioned above. However, for some reason and other, when power to the coil 13 of the electromagnet for the second blade is not disconnected, the driving member 19 for the second blade and the second blade remain at the starting positions of the exposure operation.

When the second driving member 17 for the first blade does not start the operation, the on signals are not obtained from the contact members 7a and 7b within the preset time, and hence the normal operation determining circuit determines that the operation of the second driving member 17 for the first blade is abnormal to transmit an abnormal signal to the CPU. The CPU, when receiving the abnormal signal from the normal operation determining circuit, displays an abnormal situation on an error display section, and a signal for rotating the set motor ceases to be output from the set motor power control circuit. Also, the error display section may be a part of the monitor screen of a liquid crystal display device or may be such as to independently display the error by means of an LED. It may be designed to not only display the abnormal situation, but also emit an alarm sound.

Here, in a state where the second driving member 17 for the first blade does not start operation and remains at the starting position of the exposure operation, when the set motor is rotated and the set member 27 starts the set operation from the initial position, reference is made to how the situation occurs. As described above, when the second driving member 17 for the first blade remains at the starting position of the exposure operation, the first driving member 16 for the first blade also remains at the starting position of the exposure operation. Thus, the first driving member 16 for the first blade and the second driving member 17 for the first blade are in a state shown in FIG. 11, and the set member 27 is also in a state of FIG. 11.

When the set member 27 is rotated in the clockwise direction, from this state, by the member of the camera body, the restraining member 28 is rotated in the counterclockwise direction. By slightly rotating the restraining member 28, the restraining part 28a abuts on the part 16b to be restrained of the first driving member 16 for the first blade. Since the set member 27, as mentioned above, is originally provided for the purpose of rotating the second driving member 17 for the first blade and the driving member 19 for the second blade against the biasing forces of the driving springs 23 and 26, respectively, toward the set positions, its rotating force is very great. Consequently, since the restraining member 28 is pressed, by this great force, against the first driving member 16 for the first blade being stopped, the damage of a part connecting the set member 27 with the restraining member 28 and the disturbance of a connecting relation between them are particularly caused. The same phenomena are also produced in associated operations ranging from the set motor to the set member 27. Thus, in the embodiment, provision is made for preventing the rotation of the set motor.

Also, in the explanation of Embodiment 2 described below, the description of the operation where the exposure operation of the first blade is not normally performed is eliminated, but in Embodiment 2, the shutter operation is substantially the same as in Embodiment 1. Although in the description of the operation of Embodiment 1 the switch mechanism constructed with the two contact members 7a and 7b is used as the signal source for preventing the set member from starting the next set operation, it is needless to say that the switch mechanism can be also used as the signal source for determining light-emitting timing in the flash photography.

Embodiment 2

Subsequently, Embodiment 2 will be explained. FIG. 13, like FIG. 3, is a plan view showing a state immediate after the completion of the exposure operation, and the second driving member 17 for the first blade is shown without cutting the mounting portion 17c. FIG. 14 is a sectional view showing the shutter viewed from the right side of FIG. 13 to facilitate the comprehension of the overlapping relation of components. The structure of FIG. 2 used for the explanation of Embodiment 1 is also used for the explanation of Embodiment 2, except for the restraining member 28. FIG. 12 used for the description of the operation of the Embodiment 1 is also used for that of Embodiment 2. In Embodiment 2, most of components are identical with the components of Embodiment 1. In FIGS. 13 and 14, like numerals are used for like members and parts with respect to Embodiment 1. Thus, in a structural description described below, reference is chiefly made to structures different from Embodiment 1.

A restraining member 41 of the embodiment has a restraining part 41a and an engaging part 41b and is rotatably mounted to the shaft 1i of the shutter base plate 1. The engaging part 41b, however, is not configured into a forked shape like the engaging part 28b of the restraining member 28 in Embodiment 1. In the embodiment, as seen from FIG. 14, the shaft 1i is configured to be longer than in Embodiment 1 and a spring 42 is wound round it. The spring 42 is constructed so that one end is hooked on the restraining member 41, while the other end is hooked on the shutter base plate 1, and thereby, in FIG. 13, the restraining member 41 is biased and rotated in the clockwise direction and the engaging part 41b is brought into constant contact with the projection 27e of the set member 27.

In the embodiment, as seen from FIG. 14, the cylinder 16a of the first driving member 16 for the first blade is configured to be longer than in Embodiment 1. A set spring 43 of the embodiment, unlike the set spring 34 of Embodiment 1, is wound not around the shaft 1j, but around the cylinder 16a. The set spring 43 is constructed so that one end is hooked on the first driving member 16 for the first blade, while the other end is hooked on the second driving member 17 for the first blade and only when the pin 16c to be pressed of the first driving member 16 for the first blade is separated from the pressing part 17d of the second driving member 17 for the first blade in a state of FIG. 13, the first driving member 16 for the first blade is biased in the counterclockwise direction and the second driving member 17 for the first blade is biased in the clockwise direction. The embodiment is not provided with the spring 40 wound around the shaft 1k as in Embodiment 1. Other structures are exactly the same as in Embodiment 1.

Next, the description of the operation is given in accordance with Embodiment 2, but points common to Embodiment 1 are simplified as far as possible. FIG. 13 illustrates a stopped state immediately after the exposure operation is completed. In this case, the set member 27 is located at the initial position, and the restraining member 41 brings the engaging part 41b into contact with the projection 27e of the set member 27 by means of the biasing force of the spring 42 and causes the restraining part 41a to deviate from the track of actuation of the part 16b to be restrained of the first driving member 16 for the first blade.

When the set member 27 starts the set operation from the initial position, the projection 27e presses the engaging part 41b so that the restraining member 41 is rotated in the counterclockwise direction against the biasing force of the spring 42 and the restraining part 41a is brought into the track of actuation of the part 16b to be restrained of the first driving member 16 for the first blade. Initially, the pressing part 27b of the set member 27 presses the part 17b to be pressed of the second driving member 17 for the first blade to rotate the second driving member 17 for the first blade in the counterclockwise direction against the biasing force of the driving spring 23 for the first blade. In this case, since the set spring 43 is hooked on the first driving member 16 for the first blade, between the first driving member 16 for the first blade and the second driving member 17 for the first blade, the first driving member 16 for the first blade is also rotated in the counterclockwise direction in such way that the pin 16c to be pressed follows up the pressing part 17d of the second driving member 17 for the first blade, and the three blade components 31-33 of the first blade are moved upward. By the rotation of the second driving member 17 for the first blade in the counterclockwise direction, the pressure by the operating part 17e is released and the contact between the two contact members 7a and 7b is lost. In this case, however, the signal detection by the normal operation determining circuit shown in FIG. 12 is not carried out.

After that, when the slit-forming blade component 33 of the first blade begins to cover the aperture section 1a, the pressing part 27c of the set member 27 begins to press the roller 19d of the driving member 19 for the second blade so that the driving member 19 for the second blade is rotated in the counterclockwise direction against the biasing force of the driving spring 26 for the second blade. Thus, the three blade components 37-39 of the second blade are also moved upward. After that, when the part 16b to be restrained of the first driving member 16 for the first blade come in contact with the restraining part 41a of the restraining member 41, the second driving member 17 for the first blade is continuously rotated in the counterclockwise direction by the set member 27. However, since the part 16b to be restrained is pressed by the restraining part 41a of the restraining member 41 and the first driving member 16 for the first blade is rotated in the clockwise direction to turn back, the set spring 43 hooked between the driving members 16 and 17 is strained. When the aperture section 1a is fully opened and the iron piece parts 21c and 24c of the iron piece members 21 and 24 come in contact with the iron core members 10 and 11, respectively, the set operation is completed.

In the next photography, when the release button of the camera is pushed, as shown in FIG. 12, the coils 12 and 13 are energized through the coil power control circuit by a signal from the CPU and the iron piece members 21 and 24 are attracted and held to the iron core members 10 and 11. On the other hand, by signals from the CPU, the signal detection by the normal operation determining circuit becomes possible at a preset time, and the exposure time control circuit starts the count of time according to the luminance of the object by the photometric circuit. Subsequently, when the set motor is rotated at a preset time through the set motor power control circuit by a signal from the CPU, the operation of restoration to the initial position of the set member 27 is started by the biasing force of the restoring spring.

Whereby, the restraining member 41 is also rotated in the clockwise direction by the biasing force of the spring 42 in a state where the engaging part 41b comes in contact with the projection 27e of the set member 27, and hence the first driving member 16 for the first blade is rotated in the counterclockwise direction by the biasing force of the spring 43. After that, when the three blade components 31-33 of the first blade start to completely cover the aperture section 1a, the restraining part 41a of the restraining member 41 deviates from the track of actuation of the part 16b to be restrained of the first driving member 16 for the first blade. Consequently, the first driving member 16 for the first blade is more quickly rotated than ever before and the pin 16c to be pressed abuts on the pressing part 17d of the second driving member 17 for the first blade and is stopped. Immediately after that, the set member 27 is restored to the initial position and is stopped.

In the embodiment also, as mentioned above, the restraining position by the restraining member 41 is shifted in accordance with the operation of restoration of the set member 27 to the initial position, and the first driving member 16 for the first blade is rotated in the counterclockwise direction. The restraint of the part 16b to be restrained by the restraining part 41a is released after the pin 16c to be pressed of the first driving member 16 for the first blade approaches the pressing part 17d of the second driving member 17 for the first blade. Hence, even when the restraint is released and the pin 16c to be pressed abuts on the pressing part 17d, the shock of this abutment is extremely slight and does not entirely affect a state of attraction of the iron piece member 21 to the iron core member 10. In addition, even when the pin 16c abuts on the pressing part 17d, the first driving member 16 for the first blade is little bounded, and therefore when the set member 27 is restored to the initial position, the first driving member 16 for the first blade and the first blade already rest so that the exposure operation can be started at any time.

When the set member 27 is stopped at the initial position, power to the coil 12 of the electromagnet for the first blade is first disconnected, and after a preset time, power to the coil 13 of the electromagnet for the second blade is disconnected. When power to the coil 12 is thus disconnected, the force of attraction of the iron core member 10 to the iron piece member 21 is lost and the second driving member 17 for the first blade is rapidly rotated in the clockwise direction by the biasing force of the driving spring 23 for the first blade. In this case, the pressing part 17d presses the pin 16c to be pressed to rotate the first driving member 16 for the first blade in the clockwise direction. As a result, the three blade components 31-33 of the first blade are moved downward while increasing overlapping of adjacent blade components to open the aperture section 1a with the upper end of the slit-forming blade component 33. In the embodiment, however, the set spring 43 is not strained.

On the other hand, when power to the coil 13 is disconnected, the force of attraction of the iron core member 11 to the iron piece member 24 is lost and the driving member 19 for the second blade is rapidly rotated in the clockwise direction by the biasing force of the driving spring 26 for the second blade. Consequently, the three blade components 37-39 of the second blade are moved downward while reducing overlapping of adjacent blade components to cover the aperture section 1a with the lower end of the slit-forming blade component 39. After that, the imaging surface of the image sensor is continuously exposed from top to bottom through the slit formed between the slit-forming blade components 33 and 39. When the final stage of this exposure operation is reached, the contact member 7a of the switch mechanism shown in FIG. 2 is pressed by the operating part 17e of the second driving member 17 for the first blade and is brought into contact with the contact member 7b to generate the on signal. Thus, the normal operation determining circuit shown in FIG. 12 recognizes that the exposure operation of the first blade is normally performed in accordance with the on signal, and transmits this fact to the CPU.

In this way, immediately after the switch mechanism generates the on signal, the driving pin 16d of the first driving member 16 for the first blade abuts on the shock absorbing member 4, and the operations of the two driving members 16 and 17 for the first blade and the first blade are stopped. Further, immediately after this, the driving pin 19c of the driving member 19 for the second blade abuts on the shock absorbing member 5, and the operations of the driving member 19 for the second blade and the second blade are also stopped, being restored to a state shown in FIG. 13. In this state, since a preset time passes after the signal from the CPU is sent, the signal detection by the normal operation determining circuit ceases to be made. Further, it follows from this state that the imaging information of the object is transferred from the image sensor to the memory device and thereby photography is completed.

Also, in each of the embodiments described above, the restoring spring, not shown, is hooked on the set member 27 so that the set operation of the set member 27 is performed by pressing the part 27d to be pressed with the member of the camera body and the operation of restoration to the initial position is performed by the biasing force of the restoring spring, not shown, when the pressure of the member of the camera body is released. However, the present invention is not limited to such means, and the set operation and the restoration operation of the set member may be forcedly performed by the member of the camera body, without providing the restoring spring. Further, unlike each embodiment, the set member 27 may be constructed so that it is associated not directly with the member of the camera body, but with another member provided in the shutter. In addition, each embodiment is provided with the first blade and the second blade, each having three blade components. The present invention, however, is not limited to this number of blade components, and the first blade and the second blade may each have a single blade component or may be different in the number of blade components.

What is claimed is:

1. A focal plane shutter for a digital camera, the focal plane shutter comprising:

a base plate provided with an exposure aperture section, the base plate having a first shaft, a second shaft, a third shaft, and a fourth shaft;

a first driving member for a first blade, the first driving member having a part to be restrained and being connected to a first blade assembly and rotatably mounted to the first shaft;

a second driving member for the first blade, the second driving member being rotatably mounted to the first shaft and actuated, together with the first driving member for the first blade, by a biasing force of a driving spring for the first blade in an exposure operation to cause the first blade assembly to perform the exposure operation;

a set spring configured to apply a biasing force for actuating the first driving member for the first blade and the first blade assembly toward starting positions of the exposure operation at least when the second driving member for the first blade is located at a set position;

a driving member for a second blade, the driving member for the second blade being connected to a second blade assembly, rotatably mounted to the second shaft, and actuated by a biasing force of a driving spring for the second blade in the exposure operation to cause the second blade assembly to perform the exposure operation;

a set member having a projection, the set member being rotatably mounted to the third shaft and actuated from an initial position to a set position in a set operation to actuate the second driving member for the first blade and the driving member for the second blade to set positions against biasing forces of the driving spring for the first blade and the driving spring for the second blade, respectively, and being restored to the initial position prior to the exposure operation of the first blade assembly when a release button of the digital camera is pushed; and a restraining member having a restraining part and an engaging part, the restraining member being rotatably mounted to the fourth shaft, and configured to reciprocally rotate in association with the set member by a direct engagement of the engaging part of the restraining member with the projection of the set member so that, when the set member is located at the set position, the restraining part of the restraining member comes in contact with the part to be restrained of the first driving member for the first blade and restrains a rotation of the first driving member for the first blade due to the biasing force of the set spring, to keep the exposure aperture section in a fully opened state, and so that, when the set member is restored to the initial position, the restraining member does not contact the part to be restrained of the first driving member and does not restrain the rotation of the first driving member for the first blade due to the biasing force of the set spring.

2. A focal plane shutter for digital cameras according to claim 1, wherein the engaging part of the restraining member is configured in a forked shape to hold the projection of the set member.

3. A focal plane shutter for digital cameras according to claim 2,
wherein the first blade assembly includes a plurality of arms, one end of each arm of said plurality of arms being rotatably mounted to the base plate,
wherein at least one blade of the first blade assembly is pivotally supported by the plurality of arms, and
wherein the set spring is configured so that one end thereof is hooked to one of the plurality of arms and a remaining end thereof is hooked to the base plate, with the biasing force for actuating the first driving member for the first blade and the first blade assembly toward the starting positions of the exposure operation being weaker than the biasing force of the driving spring for the first blade.

4. A focal plane shutter for digital cameras according to claim 2, wherein the set spring is configured with one end thereof hooked to the first driving member for the first blade and a remaining end thereof hooked to the second driving member for the first blade so that the biasing force is imparted in a direction for actuating the first driving member for the first blade and the first blade assembly toward the starting positions of the exposure operation only when the part to be restrained of the first driving member for the first blade is restrained by the restraining part of the restraining member.

5. A focal plane shutter for digital cameras according to claim 2, further comprising:
an operating part provided in the second driving member for the first blade;
an electromagnet for the first blade energized at an initial stage of a release, allowing the exposure operation of the first blade assembly to be performed by the second driving member for the first blade when power to the electromagnet is disconnected after an operation of restoration to the initial position of the set member;
an electromagnet for the second blade energized at the initial stage of the release, allowing the exposure operation of the second blade assembly to be performed by the driving member for the second blade when power to the electromagnet is disconnected after a start of the exposure operation of the first blade assembly; and
a switch operated by the operating part on completion of the exposure operation of the first blade assembly, constructed as a signal source for preventing the set member from starting a next set operation when the switch is out of operation for a preset time after the electromagnet for the first blade is energized.

6. A focal plane shutter for digital cameras according to claim 1, wherein the restraining member, biased by a spring to rotate in one direction, is rotated in an opposite direction against a biasing force of the spring by being pressed at the engaging part by the projection of the set member in the set operation of the set member, and is rotated by the biasing force of the spring in such a way that the engaging part follows up the projection of the set member in a restoration operation of the set member.

7. A focal plane shutter for digital cameras according to claim 6,
wherein the first blade assembly includes a plurality of arms, one end of each arm of said plurality of arms being rotatably mounted to the base plate,
wherein at least one blade of the first blade assembly is pivotally supported by the plurality of arms, and
wherein the set spring is configured so that, one end thereof is hooked to one of the plurality of arms and a remaining end thereof is hooked to the base plate, with the biasing force for actuating the first driving member for the first blade and the first blade assembly toward the starting positions of the exposure operation being weaker than the biasing force of the driving spring for the first blade.

8. A focal plane shutter for digital cameras according to claim 6, wherein the set spring is configured with one end thereof hooked to the first driving member for the first blade and a remaining end thereof hooked to the second driving member for the first blade so that the biasing force is imparted in a direction for actuating the first driving member for the first blade and the first blade assembly toward the starting positions of the exposure operation only when the part to be restrained of the first driving member for the first blade is restrained by the restraining part of the restraining member.

9. A focal plane shutter for digital cameras according to claim 6, further comprising:
   an operating part provided in the second driving member for the first blade;
   an electromagnet for the first blade energized at an initial stage of a release, allowing the exposure operation of the first blade assembly to be performed by the second driving member for the first blade when power to the electromagnet is disconnected after an operation of restoration to the initial position of the set member;
   an electromagnet for the second blade energized at the initial stage of the release, allowing the exposure operation of the second blade assembly to be performed by the driving member for the second blade when power to the electromagnet is disconnected after a start of the exposure operation of the first blade assembly; and
   a switch operated by the operating part on completion of the exposure operation of the first blade assembly, constructed as a signal source for preventing the set member from starting a next set operation when the switch is out of operation for a preset time after the electromagnet for the first blade is energized.

10. A focal plane shutter for digital cameras according to claim 1,
    wherein the first blade assembly includes a plurality of arms, one end of each of which is rotatably mounted to the base plate, and at least one blade pivotally supported by the plurality of arms, and
    wherein the set spring is configured so that one end thereof is hooked to one of the plurality of arms and a remaining end thereof is hooked to the base plate, with the biasing force for actuating the first driving member for the first blade and the first blade assembly toward the starting positions of the exposure operation being weaker than the biasing force of the driving spring for the first blade.

11. A focal plane shutter for digital cameras according to claim 10, further comprising:
    an operating part provided in the second driving member for the first blade;
    an electromagnet for the first blade energized at an initial stage of a release, allowing the exposure operation of the first blade assembly to be performed by the second driving member for the first blade when power to the electromagnet is disconnected after an operation of restoration to the initial position of the set member;
    an electromagnet for the second blade energized at the initial stage of the release, allowing the exposure operation of the second blade assembly to be performed by the driving member for the second blade when power to the electromagnet is disconnected after a start of the exposure operation of the first blade assembly; and
    a switch operated by the operating part on completion of the exposure operation of the first blade assembly, constructed as a signal source for preventing the set member from starting a next set operation when the switch is out of operation for a preset time after the electromagnet for the first blade is energized.

12. A focal plane shutter for digital cameras according to claim 1, wherein the set spring is configured with one end thereof hooked to the first driving member for the first blade and a remaining end thereof hooked to the second driving member for the first blade so that the biasing force is imparted in a direction for actuating the first driving member for the first blade and the first blade assembly toward the starting positions of the exposure operation only when the part to be restrained of the first driving member for the first blade is restrained by the restraining part of the restraining member.

13. A focal plane shutter for digital cameras according to claim 12, further comprising:
    an operating part provided in the second driving member for the first blade;
    an electromagnet for the first blade energized at an initial stage of a release, allowing the exposure operation of the first blade assembly to be performed by the second driving member for the first blade when power to the electromagnet is disconnected after an operation of restoration to the initial position of the set member;
    an electromagnet for the second blade energized at the initial stage of the release, allowing the exposure operation of the second blade assembly to be performed by the driving member for the second blade when power to the electromagnet is disconnected after a start of the exposure operation of the first blade assembly; and
    a switch operated by the operating part on completion of the exposure operation of the first blade assembly, constructed as a signal source for preventing the set member from starting a next set operation when the switch is out of operation for a preset time after the electromagnet for the first blade is energized.

14. A focal plane shutter for digital cameras according to claim 1, further comprising:
    an operating part provided in the second driving member for the first blade;
    an electromagnet for the first blade energized at an initial stage of a release, allowing the exposure operation of the first blade assembly to be performed by the second driving member for the first blade when power to the electromagnet is disconnected after an operation of restoration to the initial position of the set member;
    an electromagnet for the second blade energized at the initial stage of the release, allowing the exposure operation of the second blade assembly to be performed by the driving member for the second blade when power to the electromagnet is disconnected after a start of the exposure operation of the first blade assembly; and
    a switch operated by the operating part on completion of the exposure operation of the first blade assembly, constructed as a signal source for preventing the set member from starting a next set operation when the switch is out of operation for a preset time after the electromagnet for the first blade is energized.

15. A focal plane shutter for digital cameras according to claim 14, wherein the switch means is also constructed as a signal source for error display.

* * * * *